United States Patent [19]

Ohtsu et al.

[11] Patent Number: 5,582,916
[45] Date of Patent: Dec. 10, 1996

[54] POLYVINYL ALCOHOL FILM, PROCESS FOR THE PRODUCTION THEREOF AND LAMINATE

[75] Inventors: Kazuhiro Ohtsu, Tokorozawa; Osamu Aoki, Tokyo; Masaki Nagata, Tokyo; Junko Baba, Tokyo, all of Japan

[73] Assignee: Mitsubishi Gas Chemical Company, Inc., Tokyo, Japan

[21] Appl. No.: 404,100

[22] Filed: Mar. 14, 1995

[30] Foreign Application Priority Data

Mar. 14, 1994 [JP] Japan .................................. 6-042088
Mar. 14, 1994 [JP] Japan .................................. 6-042095

[51] Int. Cl.⁶ ..................... B32B 17/10; B32B 23/08; B32B 27/08; C08K 5/132
[52] U.S. Cl. ................. 428/412; 428/441; 428/483; 428/507; 428/515; 524/336; 524/338
[58] Field of Search ..................... 524/336, 338; 428/412, 441, 483, 507, 515

[56] References Cited

U.S. PATENT DOCUMENTS

| | | | |
|---|---|---|---|
| 2,989,416 | 6/1961 | Standish | 428/263 |
| 3,296,191 | 1/1967 | Smallwood et al. | 260/45.75 |
| 4,029,684 | 6/1977 | Avar et al. | 260/439 R |
| 4,874,672 | 10/1989 | Etter et al. | 428/457 |
| 5,087,985 | 2/1992 | Kitaura et al. | 359/350 |

FOREIGN PATENT DOCUMENTS

| | | |
|---|---|---|
| 0148397 | 7/1985 | European Pat. Off. . |
| 0275926 | 7/1988 | European Pat. Off. . |
| 61-192778 | 8/1986 | Japan . |
| 62-138423 | 6/1987 | Japan . |
| 62-181213 | 8/1987 | Japan . |
| 1-306435 | 12/1989 | Japan . |
| 2-41337 | 2/1990 | Japan . |
| 2-75683 | 3/1990 | Japan . |

*Primary Examiner*—Thomas Hamilton, III
*Attorney, Agent, or Firm*—Wenderoth, Lind & Ponack

[57] ABSTRACT

A polyvinyl alcohol film containing at least one of complexes of hydroxybenzophenone compounds having specific structure, and at least one basic compound selected from the group consisting of (i) a hydroxide, carbonate or bicarbonate of an alkali metal, (ii) carbonate or bicarbonate of ammonium, and (iii) an amine compound. The above film is excellent in the effect of blocking ultraviolet radiation in the wavelength range from 360 to 400 nm, and therefore can be used in the optical fields of polarizing sunglasses, the display fields of a liquid crystal display and fields of wrapping materials for clothes or foods as it is or as a laminate of it with other transparent film.

14 Claims, 17 Drawing Sheets

POLYVINYL ALCOHOL FILM, PROCESS FOR THE PRODUCTION THEREOF AND LAMINATE

FIELD OF INDUSTRIAL UTILIZATION

The present invention relates to a polyvinyl alcohol film absorptive of longer wavelength ultraviolet radiation and useful in a polarizing film used for polarizing sunglasses, a liquid crystal display device or the like; and wrapping materials used for wrapping clothes and foods; and materials for other various fields, a process for the production thereof, and a laminate comprising the film. More specifically, it relates to a polyvinyl alcohol film capable of blocking ultraviolet light harmful to a human body, clothes, foods and resins, particularly ultraviolet radiation in the wavelength range from 360 to 400 nm, and a process for the production thereof and a laminate comprising the same.

Prior Art

In recent years, the harmfulness of ultraviolet light to human bodies, clothes, foods and resins has been being more deeply recognized, and the harmfulness of ultraviolet radiation, particularly ultraviolet radiation in the wavelength range from 360 to 400 nm, that has been heretofore considered to be relatively safe is also pointed out. It is therefore desired to develop a technique for blocking ultraviolet radiation, particularly ultraviolet radiation in the wavelength range from 360 to 400 nm.

Particularly, a polyvinyl alcohol film that is a transparent film has been widely used as materials for polarizing film, wrapping film and the like because of its peculiar properties, and it is increasingly demanded that the polyvinyl alcohol film itself has a capability of absorbing ultraviolet radiation, particularly longer wavelength ultraviolet radiation.

Polyvinyl alcohol film is generally produced by a melt-extruding method or a casting method. When the film capable of absorbing ultraviolet light having a large wavelength is produced by these methods, however, an ultraviolet absorber must be incorporated in a large quantity since the ultraviolet absorber has generally no sufficient capability of absorbing longer wavelength ultraviolet radiation, and there arise problems concerning the sublimation or dissipation of the ultraviolet absorber, deterioration of the film appearance and decreased strength of the resultant film. These methods are therefore insufficient for practical use.

Meanwhile, a variety of methods have been proposed in which the ultraviolet absorber is used upon increasing a capability of absorbing longer wavelength ultraviolet radiation. For example, U.S. Pat. No. 2,989,416 discloses a water-soluble Werner complex comprising orthohydroxybenzophenone and chromium or aluminum. This complex is used for coating a surface of substances which decompose under ultraviolet radiation, such as molded articles, films and fibers from various polymers to protect the inside from ultraviolet radiation. However, this complex is not sufficient for fully blocking longer wavelength ultraviolet radiation, particularly in the wavelength range from 380 to 400 nm.

Further, U.S. Pat. No. 4,874,672 discloses the following plastic substrate capable of blocking ultraviolet radiation and infrared radiation.

That is, a plastic substrate having on its surface an adherent photo-product coating, which coating is formed by exposing to light in the presence of an oxygen source, a reactant mixture having a pH from about 7 to 10.5 comprising 2,2',4,4'-tetrahydroxybenzophenone and (1) ammonium hydroxide and optionally a trace amount of at least one reactive metal or (2) ammonium hydroxide and at least one metal salt or (3) at least one metal salt and at least one amine or (4) ammonium hydroxide, at least one metal salt and at least one amine, in a solvent; said metal and said metal salt being selected from the group consisting of zinc, copper, nickel, silver, iron, manganese, lead, cobalt, zirconium, mercury, palladium, cadmium, ruthenium, rhodium, and salts thereof.

For obtaining the above plastic substrate, it is required to form a coating by an optical reaction in the presence of an oxygen source. Not only the step therefor is complicated, but also the substrate is not necessarily satisfactory concerning the capability of blocking longer wavelength ultraviolet radiation.

Further, JP-A-1-306435 and JP-A-2-75683 disclose a method in which fine particles of a metal oxide are dispersed in a polyvinyl alcohol-containing solution and the dispersion is sprayed to a glass surface and dried to form a film on the glass surface. JP-A-2-41337 discloses a method in which a solution containing polyvinyl alcohol and polytungstic acid is applied to a substrate and dried to form a film. The problem with these methods is that not only the operation procedures are complicated but also the ultraviolet radiation absorption capability of the film is not sufficient.

SUMMARY OF THE INVENTION

It is a first object of the present invention to provide a polyvinyl alcohol film excellent in blocking ultraviolet radiation, particularly ultraviolet radiation in the wavelength range from 360 to 400 nm, harmful to a human body, clothes, foods and resins.

It is a second object of the present invention to provide a polyvinyl alcohol film having the aforesaid ultraviolet radiation blocking effect, which film can be produced by a simple process at a low cost.

It is a third object of the present invention to provide a process for industrially advantageously producing a polyvinyl alcohol film having the above effects.

It is a fourth object of the present invention to provide a laminate comprising the polyvinyl alcohol film having the above effects.

DETAILED DESCRIPTION OF THE INVENTION

According to the present invention, the above objects and advantages of the present invention are achieved by a polyvinyl alcohol film containing at least one of complexes of a hydroxybenzophenone compound of the formula (I),

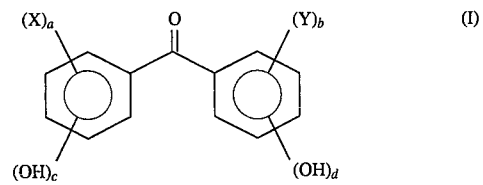

wherein each of X and Y is independently a halogen atom, an alkyl group, an aryl group, an alkoxyl group, an amino group, an acyl group, a carboxyl group, a sulfonic acid group or a metal salt thereof, each of a, b, c and d is independently an integer of 0 to 5, (c+d) is an integer of 1 to 10, (a+c) is an integer of 0 to 5, and (b+d) is an integer of 0 to 5, and at least one basic compound selected from the group consisting of (i) a hydroxide, carbonate or bicarbonate of an alkali metal, (ii) carbonate or bicarbonate of ammonium, and (iii) an amine compound.

Further, the above objects and advantages of the present invention are achieved by a process for the production of a polyvinyl alcohol film having the above properties, which comprises immersing a polyvinyl alcohol film in an aqueous medium solution containing (a) a compound of the above formula (I) and (b) at least one basic compound selected from the group consisting of (i) a hydroxide, carbonate or bicarbonate of an alkali metal, (ii) carbonate or bicarbonate of ammonium and (iii) an amine compound, and then drying the polyvinyl alcohol film.

The present invention will be further detailed hereinafter.

In the present invention, the polyvinyl alcohol film as a base film which does not contain the above complex is sometimes abbreviated as "PVA film (B)" hereinafter, and the polyvinyl alcohol film which is the intended product containing the above complex is sometimes abbreviated as "PVA film (A)" hereinafter.

The PVA film (A) as an object of the present invention contains a complex of a hydroxybenzophenone compound of the formula (I) and at least one of the above basic compounds (i) to (iii).

The PVA film (B) as a base film may be any one of Polyvinyl alcohol films which are generally used as materials for a polarizing film, a wrapping material or the like. Further, the PVA film (B) may be an unstretched film or a stretched film. The stretched film may be any one of a monoaxially stretched film and a biaxially stretched film. Although differing depending upon the field of use, other resin film and glass used for the lamination, the thickness of the PVA film (B) is generally 5 to 500 μm, preferably 10 to 100 μm.

The content of vinyl alcohol unit in the polyvinyl alcohol for forming the PVA film (B) is preferably at least 70 mol %, more preferably at least 80 mol % based on the whole monomer units, and it may contain a small amount of other unit(s) from copolymerizable vinyl monomers such as ethylene, vinyl stearate, methyl vinyl ether, methyl (meth)acrylate, acrylamide, acrylic acid or its ester, vinyl sulfonate, vinyl pyrimidine and acrylic alcohol. The polyvinyl alcohol may be completely saponified or partially saponified. Further, the PVA film (B) may be partially converted into formal or acetal, and the transmittance of the PVA film (B) in the visible light region may be properly adjusted with iodine or a dye.

In the present invention, the hydroxybenzophenone compound which forms a complex contained in the PVA film (A) is represented by the formula (I) described above. In the formula (I), X and Y is independently a halogen atom, an alkyl group, an aryl group, an alkoxyl group, an amino group, an acyl group, a carboxyl group, a sulfonic acid group or a metal salt thereof. Specific examples of these X and Y include halogen atoms such as fluorine, chlorine, bromine and iodine; lower alkyl groups having 1 to 6 carbon atoms such as methyl, ethyl, propyl, butyl and hexyl; aryl groups having 6 to 15 carbon atoms such as phenyl and naphthyl; lower alkoxyl groups having 1 to 6 carbon atoms such as methoxy, ethoxy, propoxy, butoxy and hexyloxy; an amino group; acyl groups having 2 to 6 carbon atoms such as acetyl and propionyl; a carboxyl group; and a sulfonic acid group.

The carboxyl or sulfonic acid group may be a salt of an alkali metal or an alkaline earth metal.

In the above formula (I), each of a, b, c and d is independently an integer of 0 to 5, while (c+d) is an integer of 1 to 10, preferably an integer of 2 to 6, (a+c) is an integer of 0 to 5, and (b+d) is an integer of 0 to 5. In the above formula (I), each of c and d indicates a number of hydroxyl groups, while at least one of the hydroxyl groups is preferably substituted on the 2-position (or 2'-position).

Specific examples of the hydroxybenzophenone compound of the formula (I) include 2-hydroxy-4-methoxybenzophenone, 2-hydroxy-4-chlorobenzophenone, 2-hydroxy-4-methoxybenzophenone-5-sulfonic acid, 2-hydroxy-2'-carboxy-4-methoxybenzophenone, 2,2'-dihydroxybenzophenone, 2,4-dihydroxybenzophenone, 4,4'-dlhydroxybenzophenone, 2,2'-dihydroxy-4-methoxybenzophenone, 2,2'-dihydroxy-4,4'-dimethoxybenzophenone, 2,2',4-trihydroxybenzophenone, 2,2',4,4'-tetrahydroxybenzophenone, 2,2',5,5'-tetrahydroxybenzophenone, 2,2',4,5'-tetrahydroxybenzophenone, 2,2',4,4'-tetrahydroxy-6,6'-dimethylbenzophenone, and 2,2',3,3',4,4'-hexahydroxybenzophenone. Of these, preferred are 2,2'-dihydroxy-4-methoxybenzophenone and 2,2',4,4'-tetrahydroxybenzophenone.

The complex contained in the PVA film (A) in the present invention is formed from the hydroxybenzophenone compound of the formula (I) and at least one of the following basic compounds (i) to (iii).

(i) a hydroxide, carbonate or bicarbonate of an alkali metal, (ii) carbonate or bicarbonate of ammonium, and (iii) an amine compound.

The alkali metal in the above (i) includes lithium, sodium and potassium, and the compound coming under the above (i) includes, for example, lithium hydroxide, sodium hydroxide, potassium hydroxide, lithium carbonate, sodium carbonate, potassium carbonate, lithium bicarbonate, sodium bicarbonate and potassium bicarbonate. The compound coming under the above (ii) includes, for example, ammonium carbonate and ammonium bicarbonate.

The amine compound coming under the above (iii) includes organic amines such as aliphatic, alicyclic or aromatic primary, secondary and tertiary amines and saturated or unsaturated heterocyclic amines. These organic amine have 30 carbon atoms or less, preferably 25 carbon atoms or less. Specific examples of the organic amines include methylamine, dimethylamine, trimethylamine, ethylamine, diethylamine, triethylamine, n-propylamine, di-n-propylamine, tri-n-propylamine, isopropylamine, diisopropylamlne, n-butylamine, di-n-butylamine, isobutylamine, sec-butylamine, tert-butylamine, n-pentyamine, sec-pentylamine, n-hexylamine, sec-hexylamine, cyclohexylamine, ethylenediamine, propylenediamine, tetramethylenediamine, hexamethylenediamine, diethylenetriamine, tetraethylenepentamine, ethanolamine, diethanolamine, triethanolamine, benzylamine, aniline, toluidine, pyrrolidine, piperidine, morpholine, triethylenediamine, pyridine, picoline, lutidine, quinoline, DBN (1,8-diazabicyclo[4.3.0]-5-nonene), DBU (1,8-diazabicyclo[5.4.0]-7-undecene) and triethylenediamine.

Of the above amine compounds, preferred are diethylamine, triethylamine, n-propylamine, isopropylamine, n-butylamine, isobutylamine, sec-butylamine, tert-butylamine, n-pentylamine, sec-pentylamine, n-hexylamine, sec-hexylamine, cyclohexylamine, ethylenediamine, propylenediamine, tetramethylenediamine, hexamethylenediamine, diethylenetriamine, tetraethylenepentamine, ethanolamine, diethanolamine, triethanolamine, pyrrolidine, piperidine, morpholine, triethylenediamine, DBN and DBU.

Of the above basic compounds (i) to (iii), the compounds (i) and (ii) are superior in respect of the operability, safety and cost.

The complex used in the present invention is formed from the hydroxybenzophenone compound of the formula (I) and the above basic compound. The proportions of the hydroxybenzophenone compound and the basic compound in the complex vary depending mainly upon the bonding site and number of hydroxyl groups in the hydroxybenzophenone compound or a combination of those compounds.

However, it is advisable that the proportion of the compound in the complex, i.e., a complex ratio defined by the following equation, is generally in the range of from 0.1 to 10, preferably in the range of from 0.2 to 5.

$$\text{Complex ratio} = \frac{\text{Basic compound (mol)}}{\text{Hydroxybenzophenone (mol)}}$$

The PVA film (A) of the present invention can accomplishes the objects required as a film so long as it contains the above complex in an amount effective for blocking longer wavelength ultraviolet radiation. The term "longer wavelength" refers to a wavelength range from 360 to 400 nm. The complex in the PVA film (A) of the present invention is difficult to analyze for its amount in the form of a complex. However, the complex can be analyzed in the form of each of a hydroxybenzophenone compound and a basic compound by methods to be described later.

The content of the hydroxybenzophenone compound in the PVA film (A) of the present invention per 1 $cm^2$ of the film, analyzed by the method described later, is 6 to 600 μg, preferably 10 to 500 μg. Further, the content of the basic compound, analyzed by the method described later, is "effective" when it satisfies the above complex ratio in the range of from 0.1 to 10, preferably 0.2 to 5.

The PVA film (A) of the present invention can be produced by immersion-treating the PVA film (B) in an aqueous medium solution containing the above (a) hydroxybenzophenone compound and the above (b) basic compound, and drying it.

The solvent for forming the above aqueous medium solution is selected from water and a mixed solvent containing water and an organic solvent compatible with water. When the mixed solvent is used, the water/organic solvent ratio is 95/5 to 5/95, particularly properly 90/10 to 10/90. The organic solvent includes methanol, ethanol, acetonitrile, tetrahydrofuran and tetrahydropyran.

The concentration of the hydroxybenzophenone compound in the aqueous medium solution used for the above immersion treatment may be in such a range that the PVA film (A) can contain the above-described amount of the hydroxybenzophenone compound. The above concentration of the hydroxybenzophenone compound is generally in the range of from 0.5 to 500 g/l, preferably 1 to 100 g/l.

Further, the amount of the basic compound in the aqueous medium solution is desirably in such a range that the amount of the basic compound per mole of the hydroxybenzophenone compound is in the range of from 0.1 to 10 mol, preferably 0.2 to 5 mol. Generally, with an increase in the basic compound amount, more easily the hydroxybenzophenone compound can be dissolved, and the ultraviolet radiation absorption capability of the PVA film (A) tends to shift toward a longer wavelength side. When the amount of the basic compound is less than the above lower limit, the film insufficiently shows the capability of absorbing longer wavelength ultraviolet radiation. When the amount of the basic compound is more than the above upper limit, undesirably, the resultant film shows decreased durability and strength and the above complex can not be contained sufficiently in the PVA film (A).

Further, it is advisable that a neutral inorganic salt such as sodium chloride, sodium sulfate, potassium chloride, potassium sulfate or the like is added in the aqueous medium solution in such an amount that it has a concentration of 0.1 to 100 g/l, since the content of the hydroxybenzophenone and the basic compound in the PVA can be increased.

The immersion treatment of the PVA film (B) is carried out at a temperature of 10° to 80° C., preferably 20° to 50° C., for 0.1 to 120 minutes, preferably 0.5 to 60 minutes.

The above immersion-treated film is then dried to obtain the intended PVA film (A). This drying treatment is carried out under conditions where the solvent is removed. Generally, it is carried out at a temperature of 30° to 150° C., preferably 50° to 120° C., for 0.1 to 120 minutes, preferably 1 to 60 minutes.

The PVA film (A) of the present invention contains the above complex in an amount sufficient for blocking longer wavelength ultraviolet radiation. The PVA film (A) of the present invention produces a high effect that it can block ultraviolet radiation in the wavelength range from 360 to 400 nm. The PVA film (A) of the present invention produces an excellent effect that the transmittance thereof to ultraviolet radiation having a wavelength, e.g., of 400 nm is 4% or less.

The PVA film (A) of the present invention can be used in fields known per se, particularly as a polarizing film used for polarizing sunglasses, a liquid crystal display and a wrapping material for wrapping cloth or food.

In this case, a transparent resin film such as a polycarbonate resin, an acrylic resin, e.g., poly(methyl methacrylate), an allyl resin, e.g., polydiethyleneglycol bis-(allyl carbonate), a cellulose resin, e.g., triacetyl cellulose, a polyester resin, e.g., polyethyleneterephthalate or a polypropylene resin, or a glass plate is laminated on one surface or both surfaces of the PVA film (A) of the present invention, while it is preferred that both surfaces of the PVA film (A) are laminated with transparent resin film or glass plate.

The present invention will be detailed hereinafter with reference to Examples and Comparative Examples. It should be understood that these examples and Comparative Examples are for the purpose of explanation and are not intended to limit the scope of the present invention.

In Examples and Comparative Examples, the transmittance was measured with a spectrophotometer (trade name: Ubest-85, supplied by Japan Spectroscopic Co., Ltd). The single plate transmittance was an average value obtained after correcting the visual sensitivity in a visible region from 400 to 700 nm.

The hydroxybenzophenone compound and the basic compound in the polyvinyl alcohol film were analyzed by the following methods.

Analysis of hydroxybenzophenone compound

A solution prepared by solving the PVA film (A) in a hot water was analyzed by HPLC to determine the hydroxybenzophenone compound in the PVA film.

Analysis of basic compound

The above solution was titrated with hydrochloric acid under observation of the shift of absorption wavelength of hydroxybenzophenone compound, and the basic compound in the PVA film was determined from the amount of hydrochloric acid required to complete the shift.

EXAMPLE 1

Figure 1:
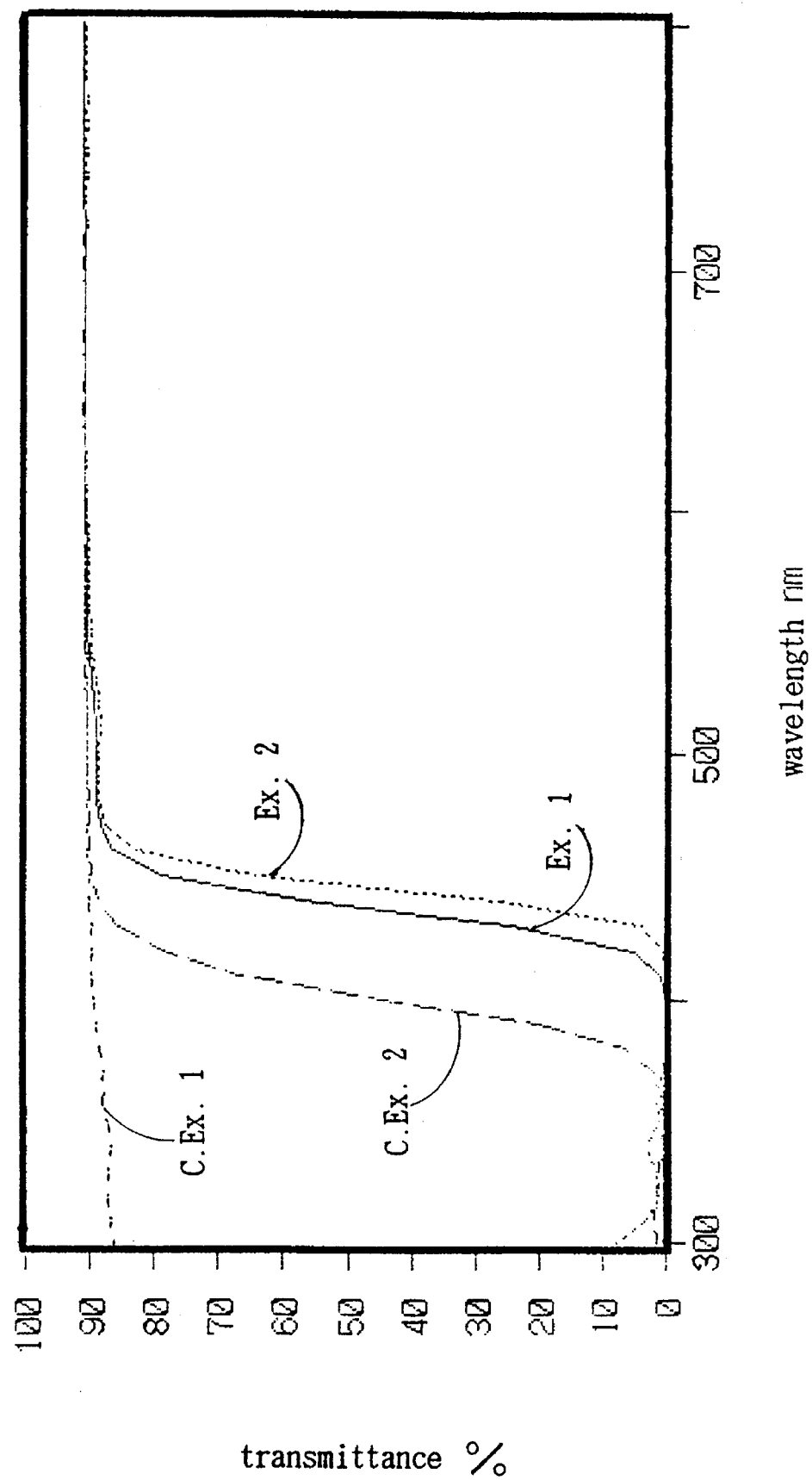
FIG. 1 shows spectral curves of a polyvinyl alcohol film prepared in Examples 1 and 2 and Comparative Examples 1 and 2.
Figure 2:
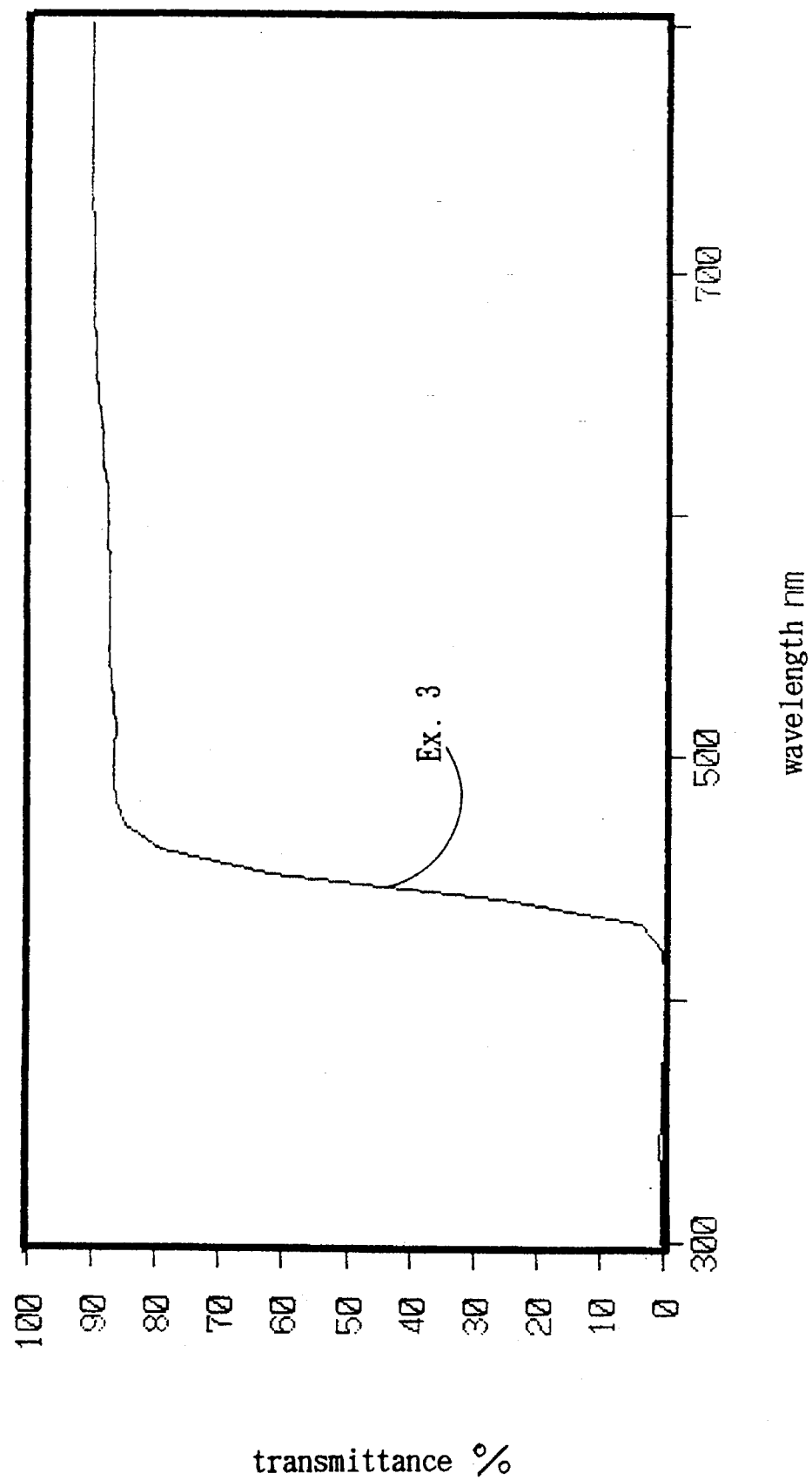
FIG. 2 shows a spectral curve of a polyvinyl alcohol film prepared in Example 3.
Figure 3:
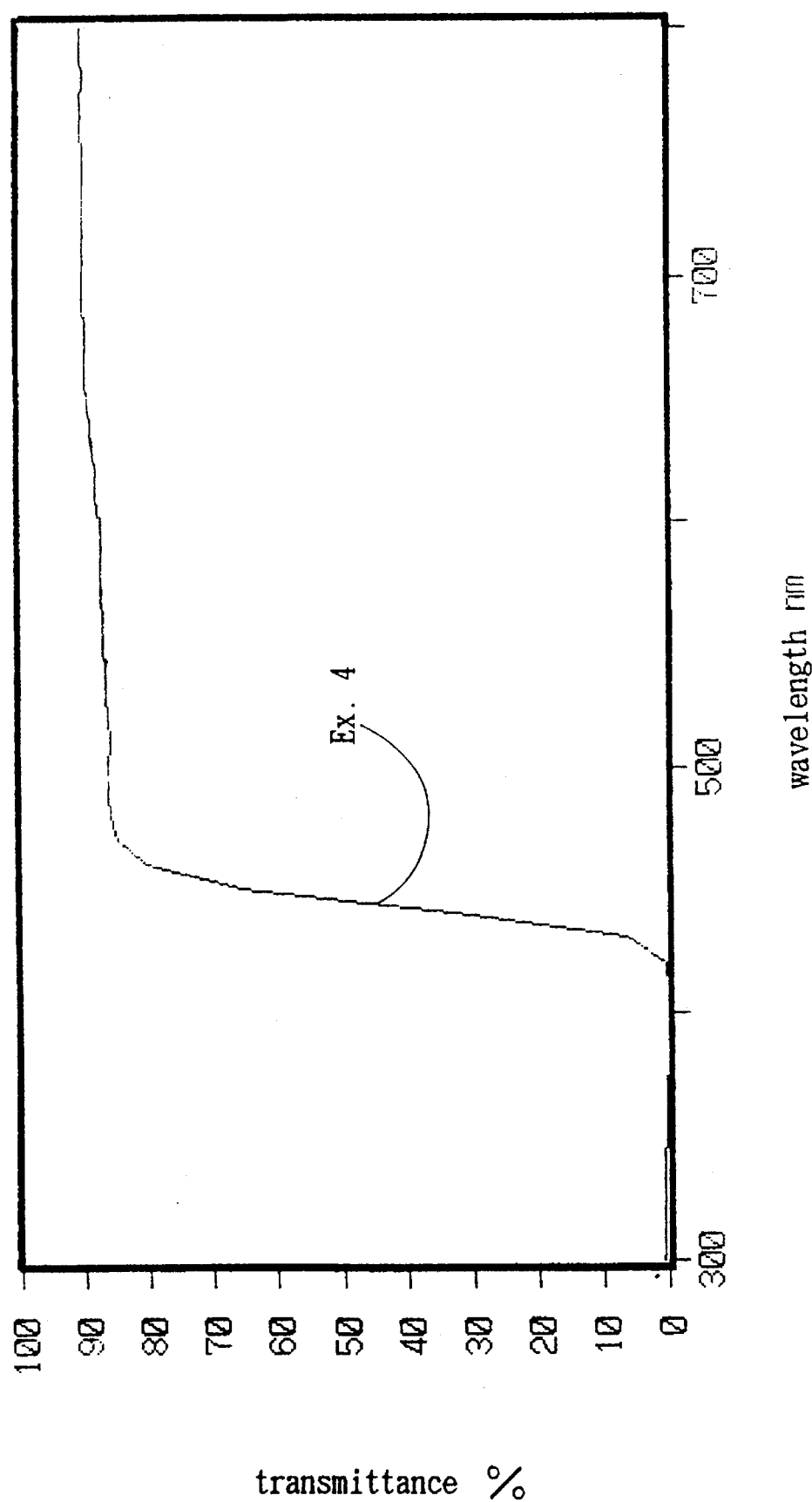
FIG. 3 shows a spectral curve of a polyvinyl alcohol film prepared in Example 4.
Figure 4:
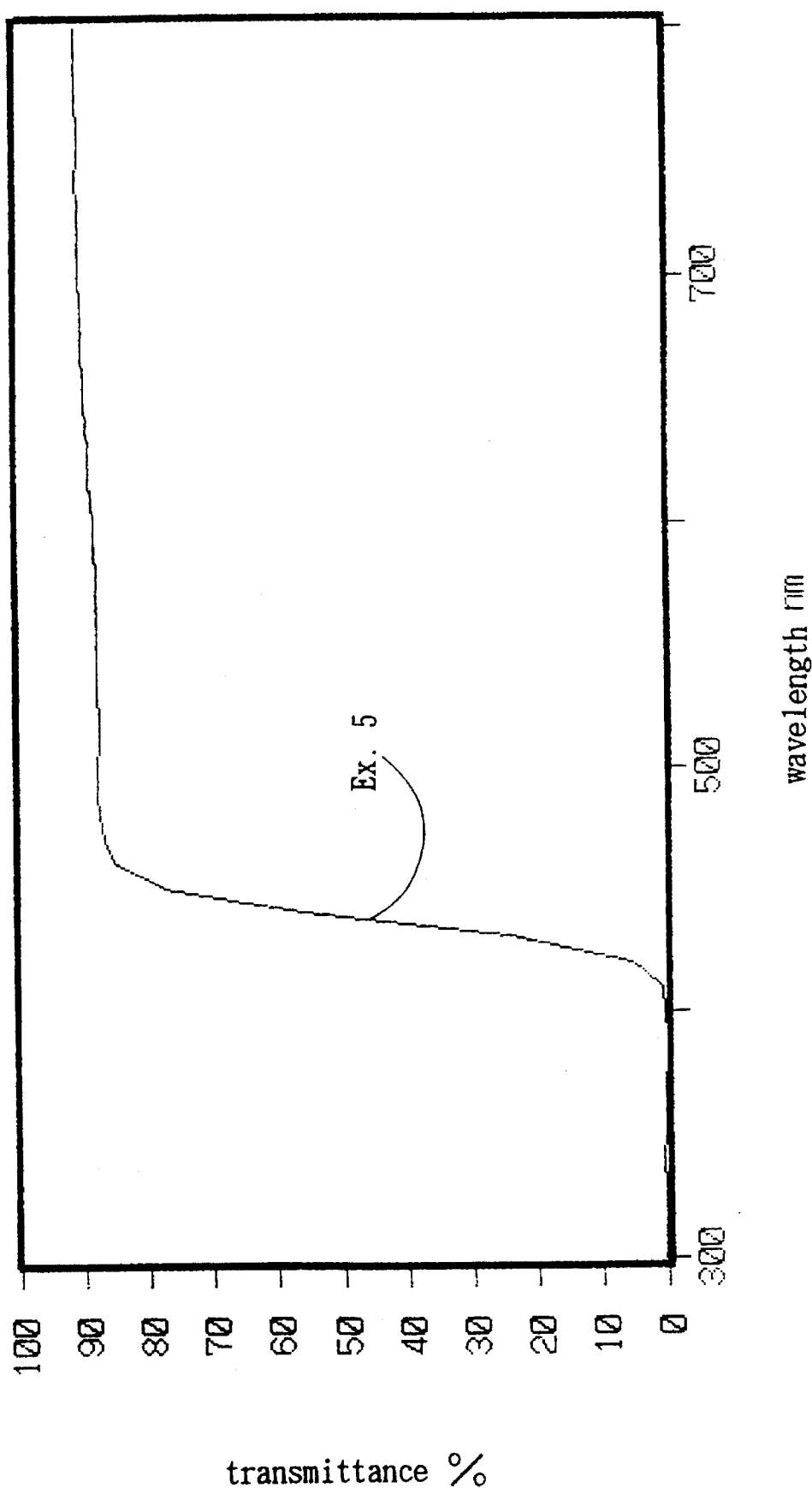
FIG. 4 shows a spectral curve of a polyvinyl alcohol film prepared in Example 5.
Figure 5:
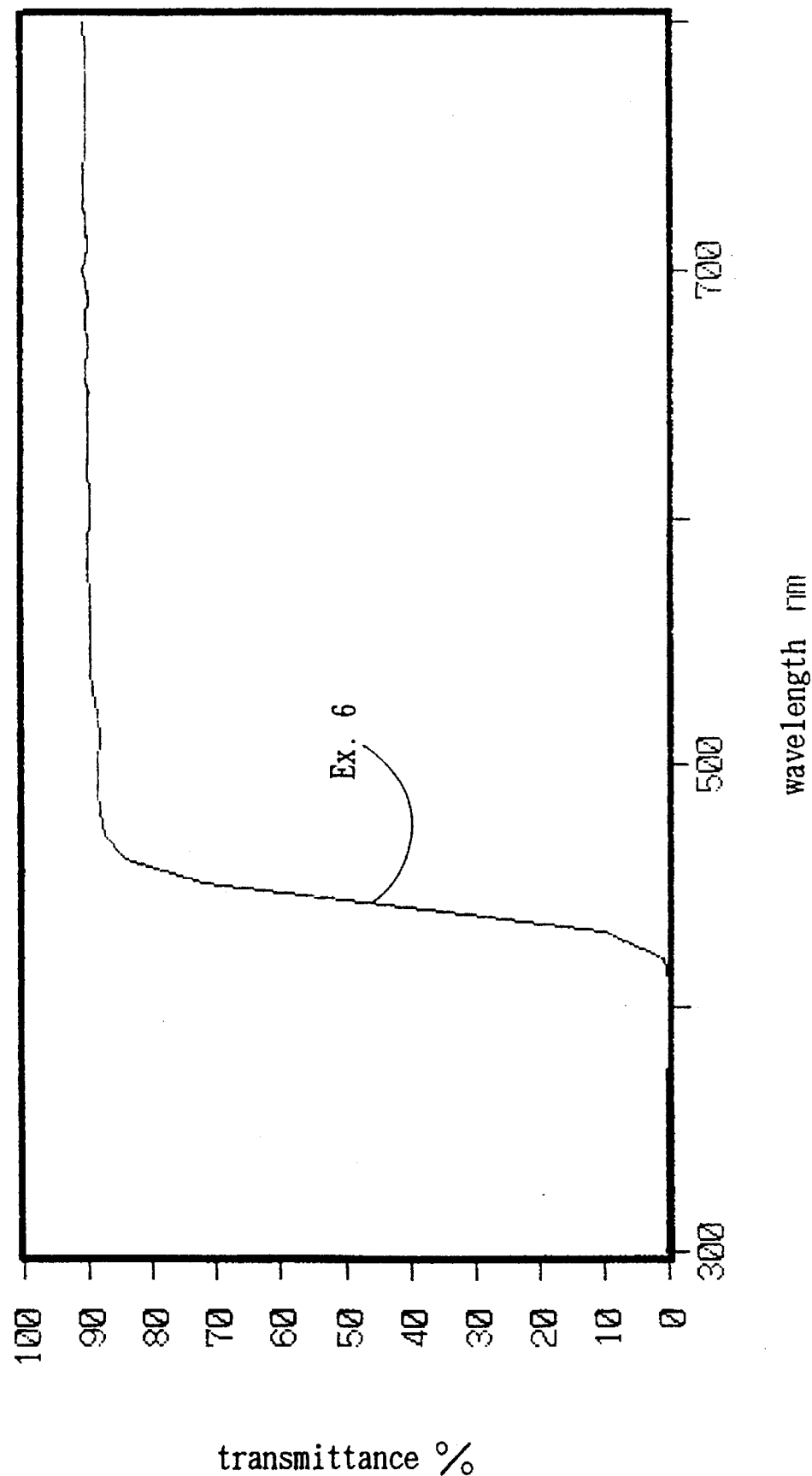
FIG. 5 shows a spectral curve of a polyvinyl alcohol film prepared in Example 6.
Figure 6:
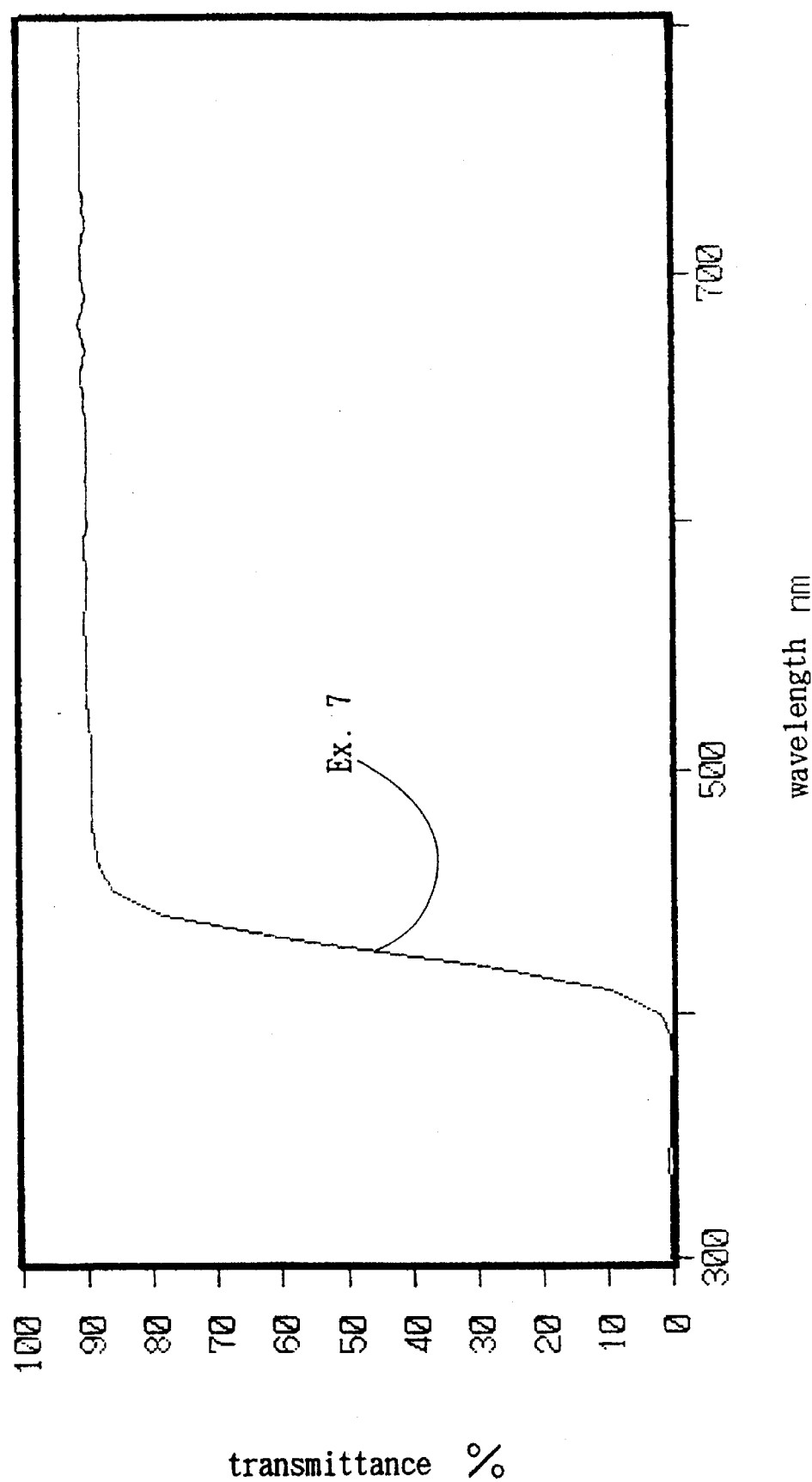
FIG. 6 shows a spectral curve of a polyvinyl alcohol film prepared in Example 7.
Figure 7:
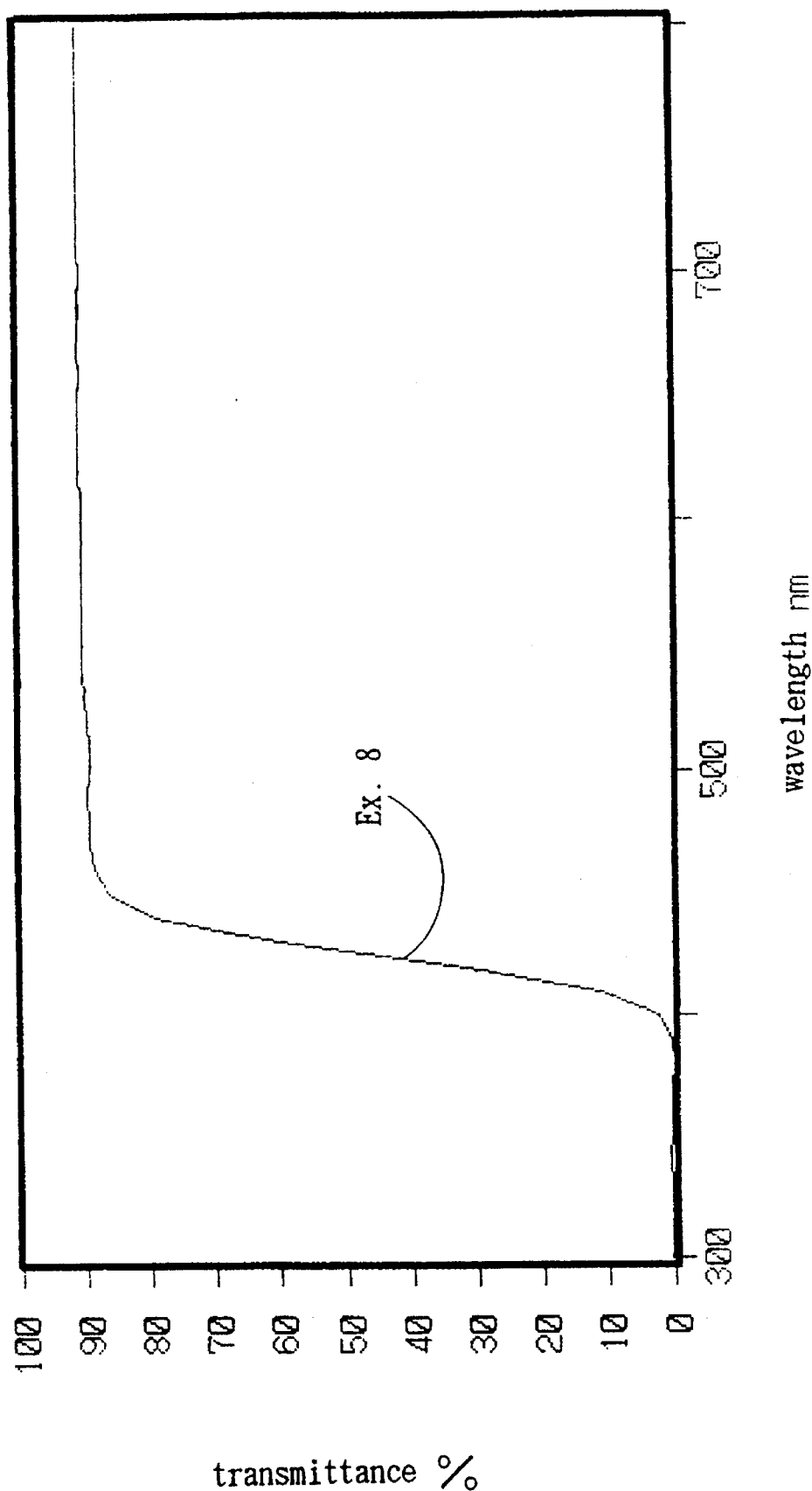
FIG. 7 shows a spectral curve of a polyvinyl alcohol film prepared in Example 8.
Figure 8:
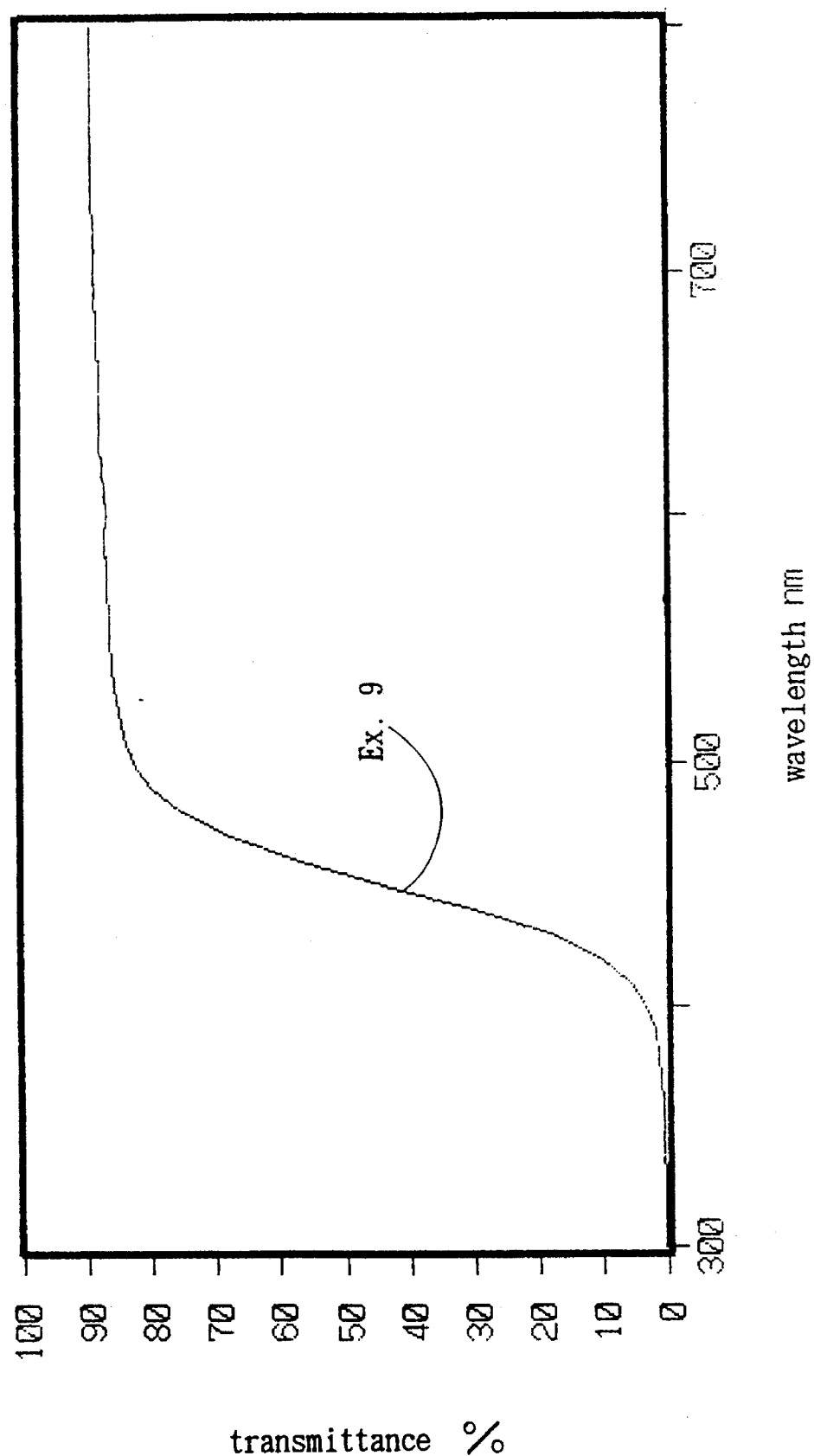
FIG. 8 shows a spectral curve of a polyvinyl alcohol film prepared in Example 9.
Figure 9:
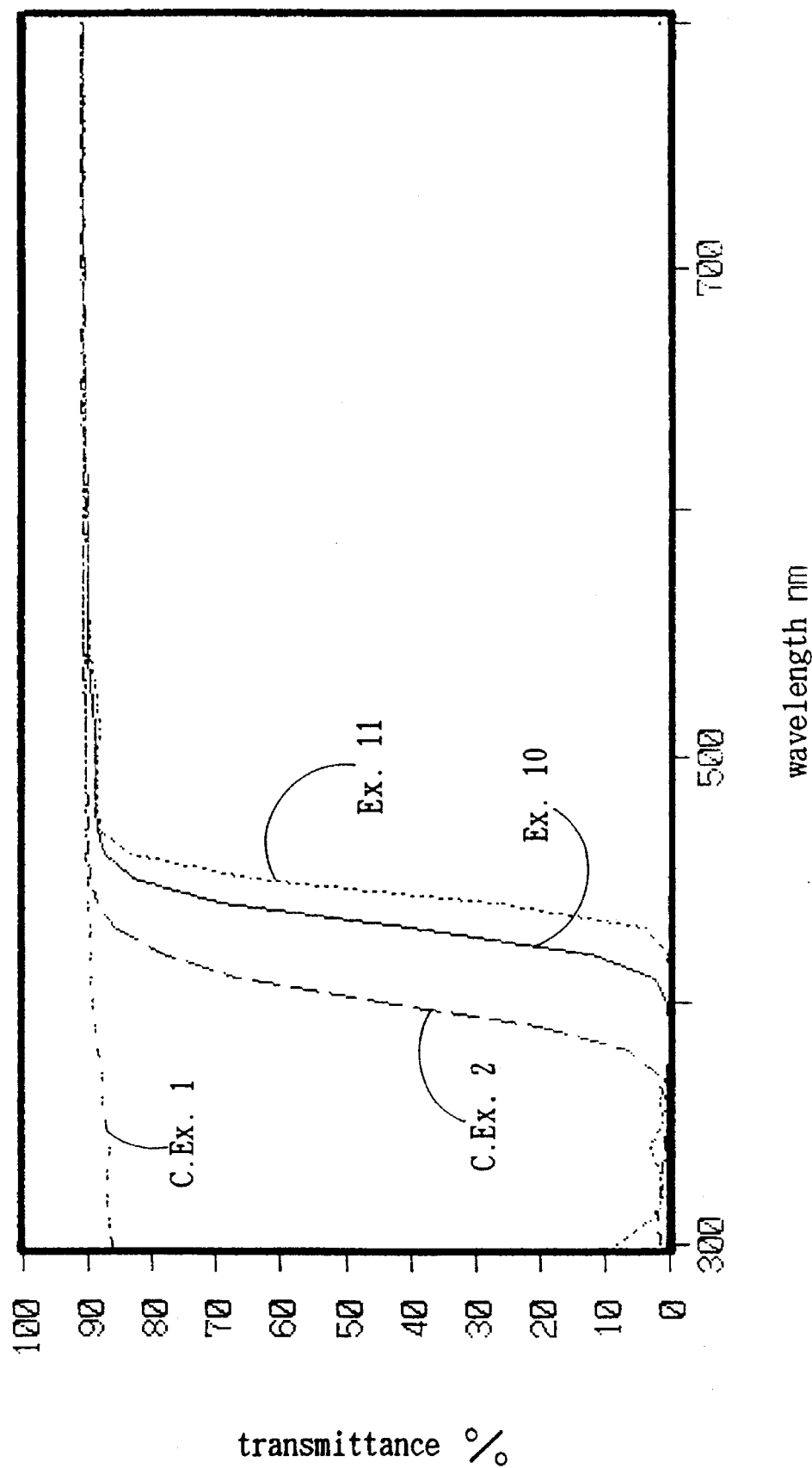
FIG. 9 shows spectral curves of a polyvinyl alcohol film prepared in Examples 10 and 11 and Comparative Examples 1 and 2.
Figure 10:
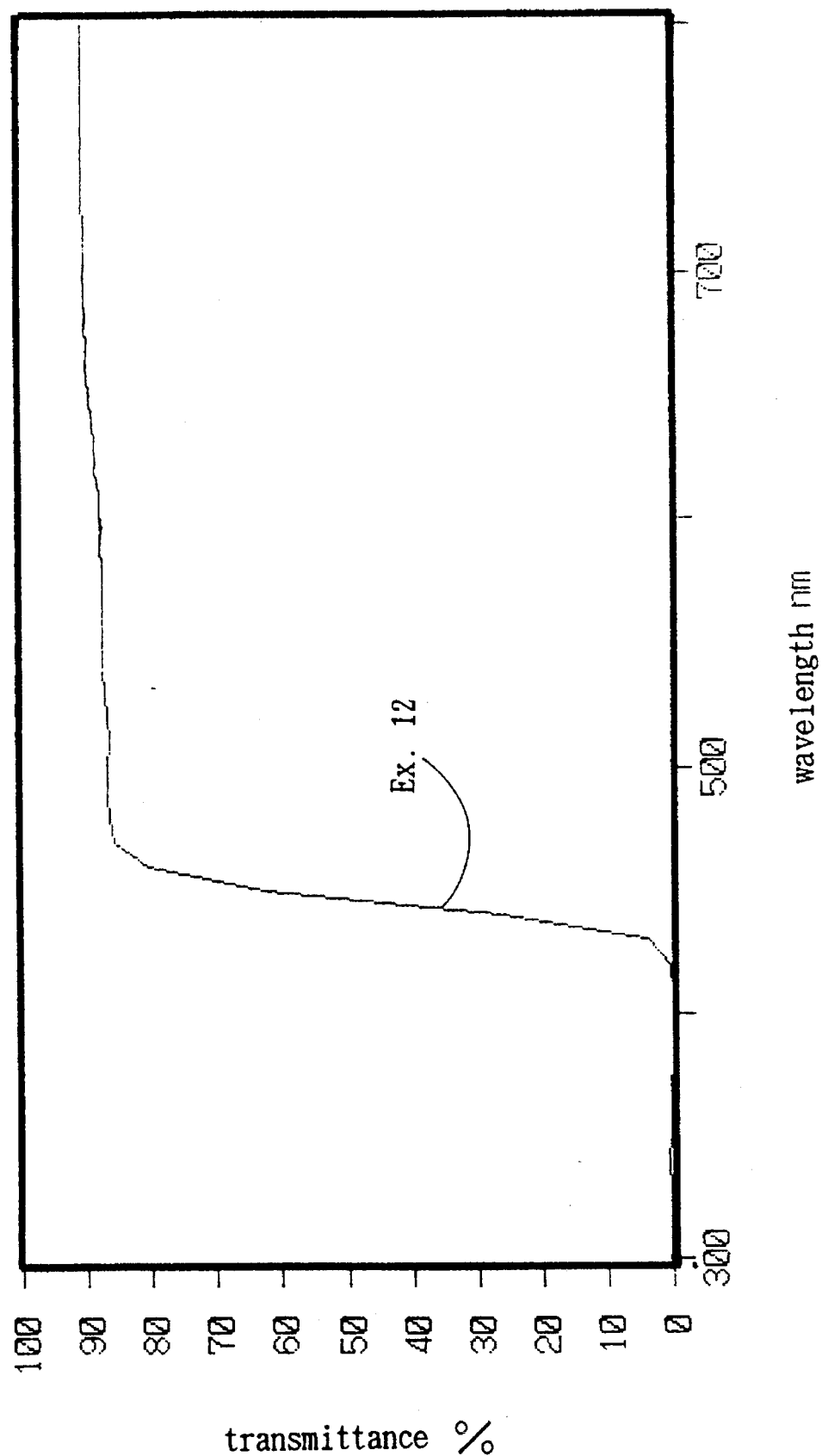
FIG. 10 shows a spectral curve of a polyvinyl alcohol film prepared in Example 12.
Figure 11:
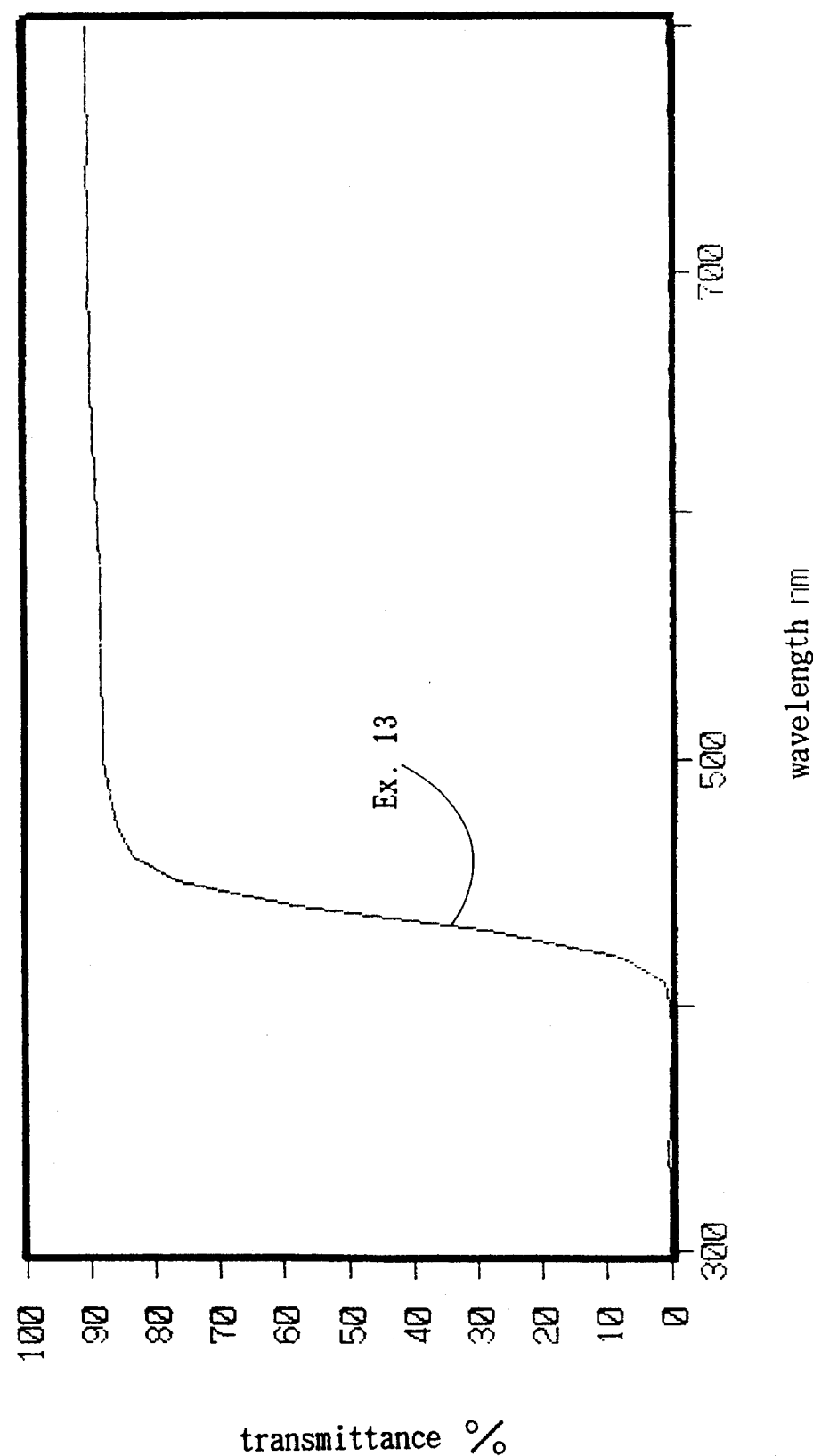
FIG. 11 shows a spectral curve of a polyvinyl alcohol film prepared in Example 13.
Figure 12:
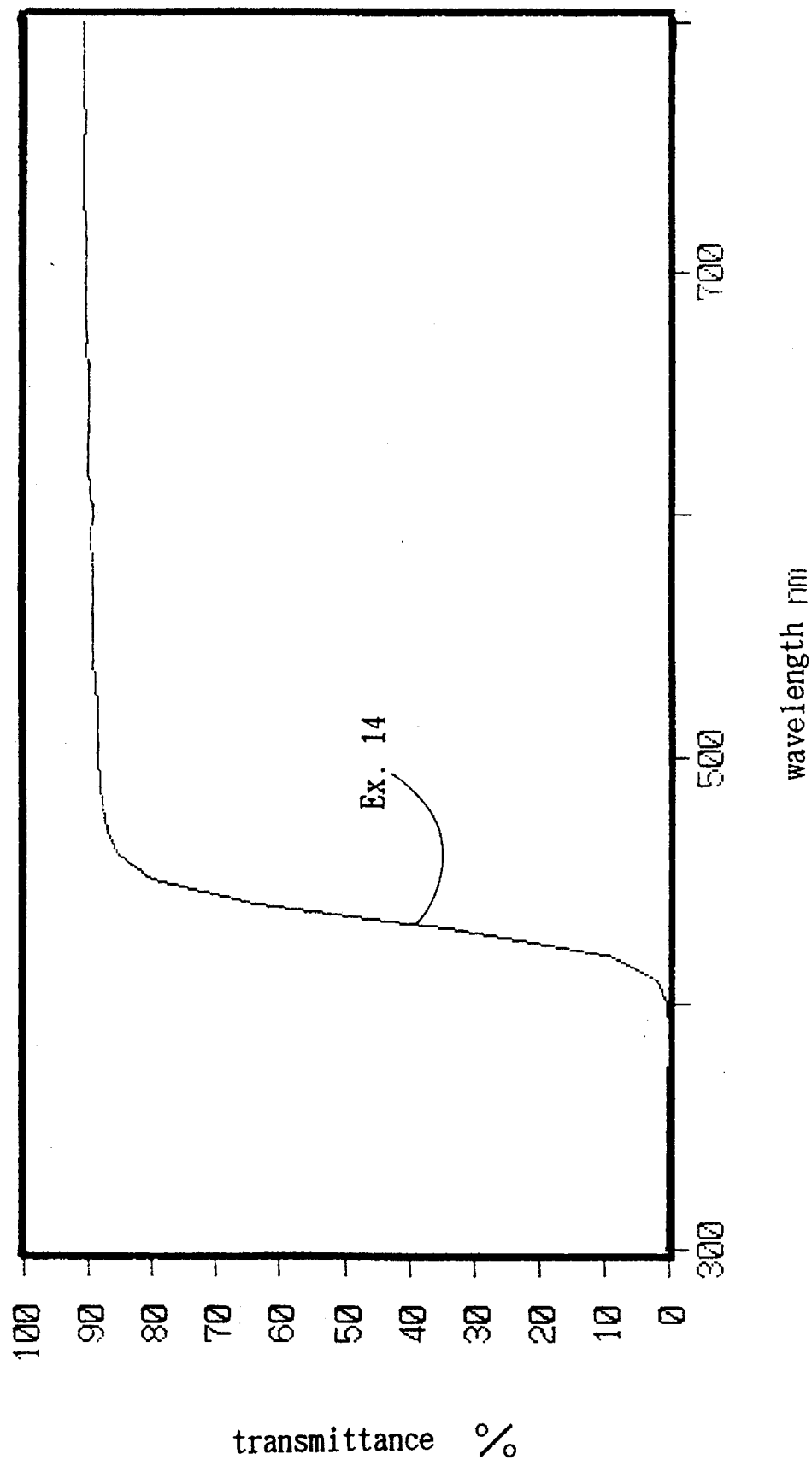
FIG. 12 shows a spectral curve of a polyvinyl alcohol film prepared in Example 14.
Figure 13:
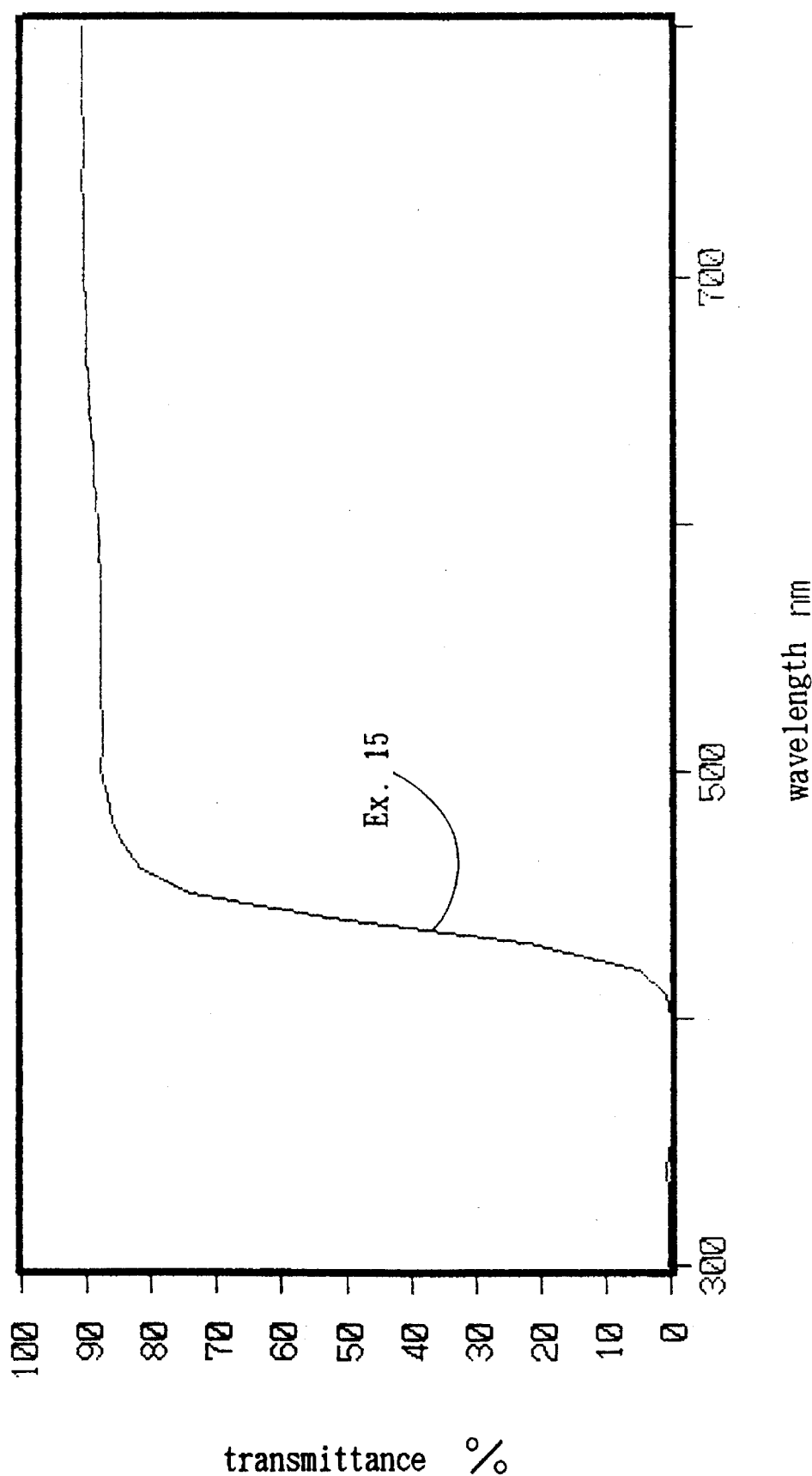
FIG. 13 shows a spectral curve of a polyvinyl alcohol film prepared in Example 15.
Figure 14:
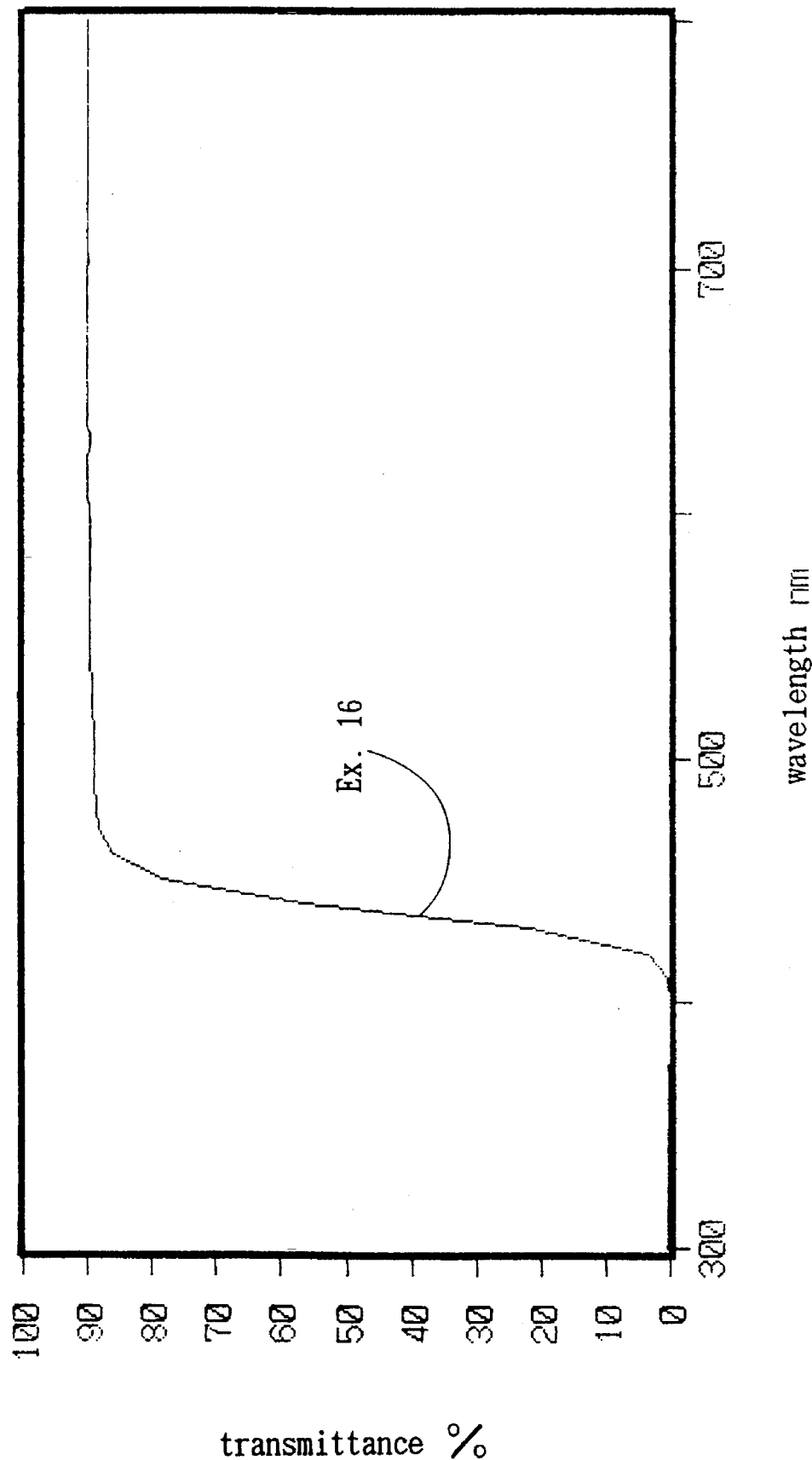
FIG. 14 shows a spectral curve of a polyvinyl alcohol film prepared in Example 16.
Figure 15:
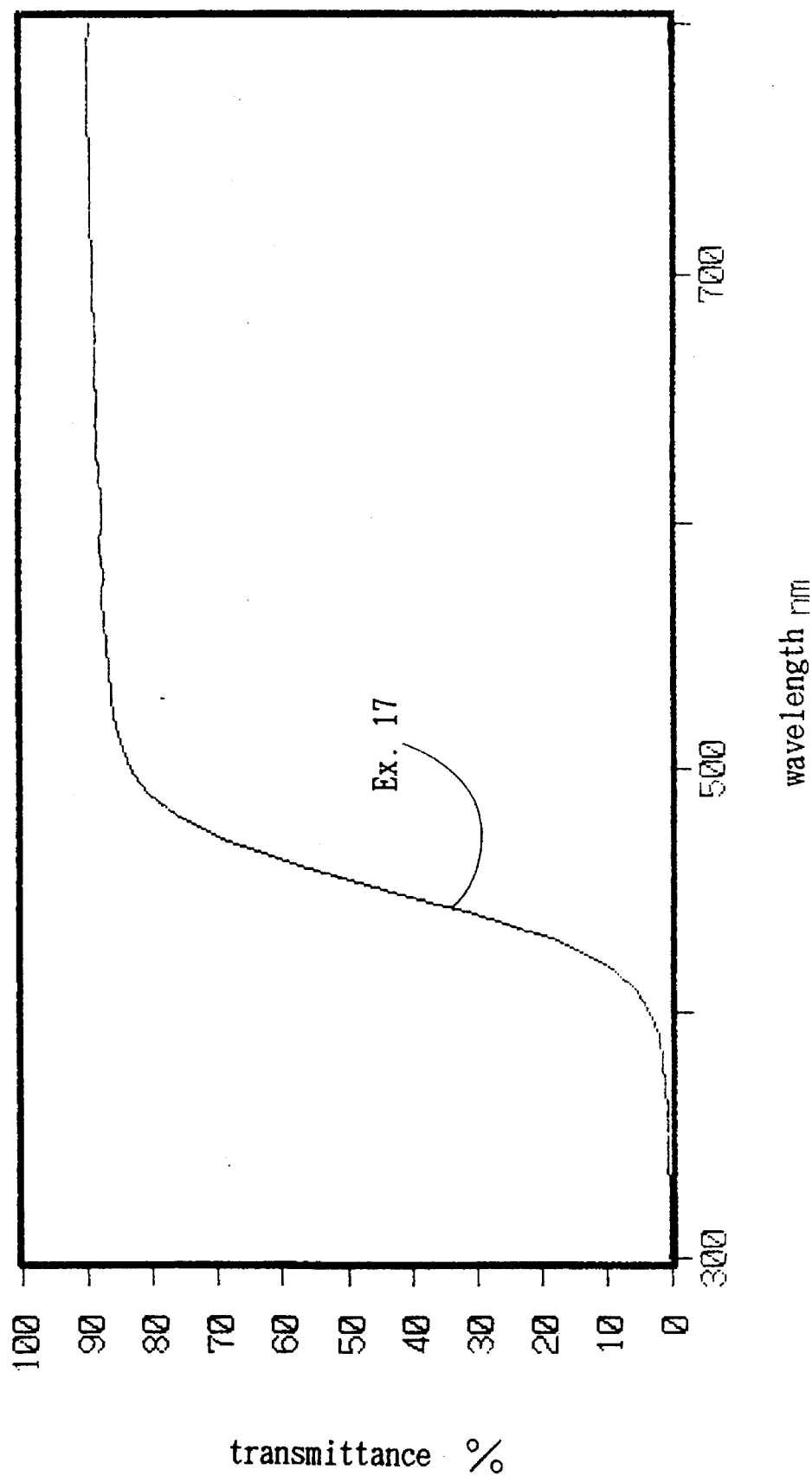
FIG. 15 shows a spectral curve of a polyvinyl alcohol film prepared in Example 17.
Figure 16:
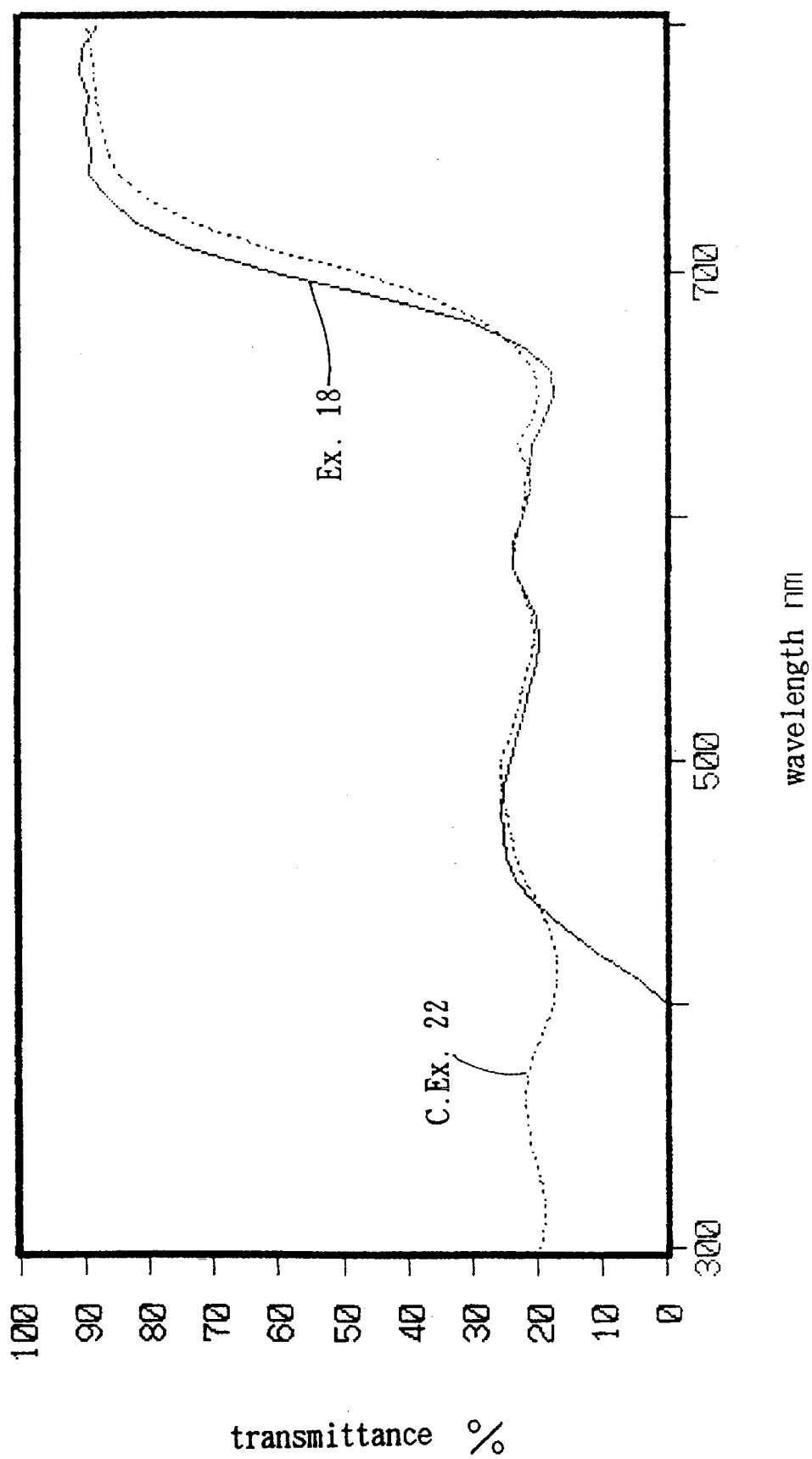
FIG. 16 shows spectral curves of a polyvinyl alcohol film prepared in Example 18 and Comparative Example 22.
Figure 17:
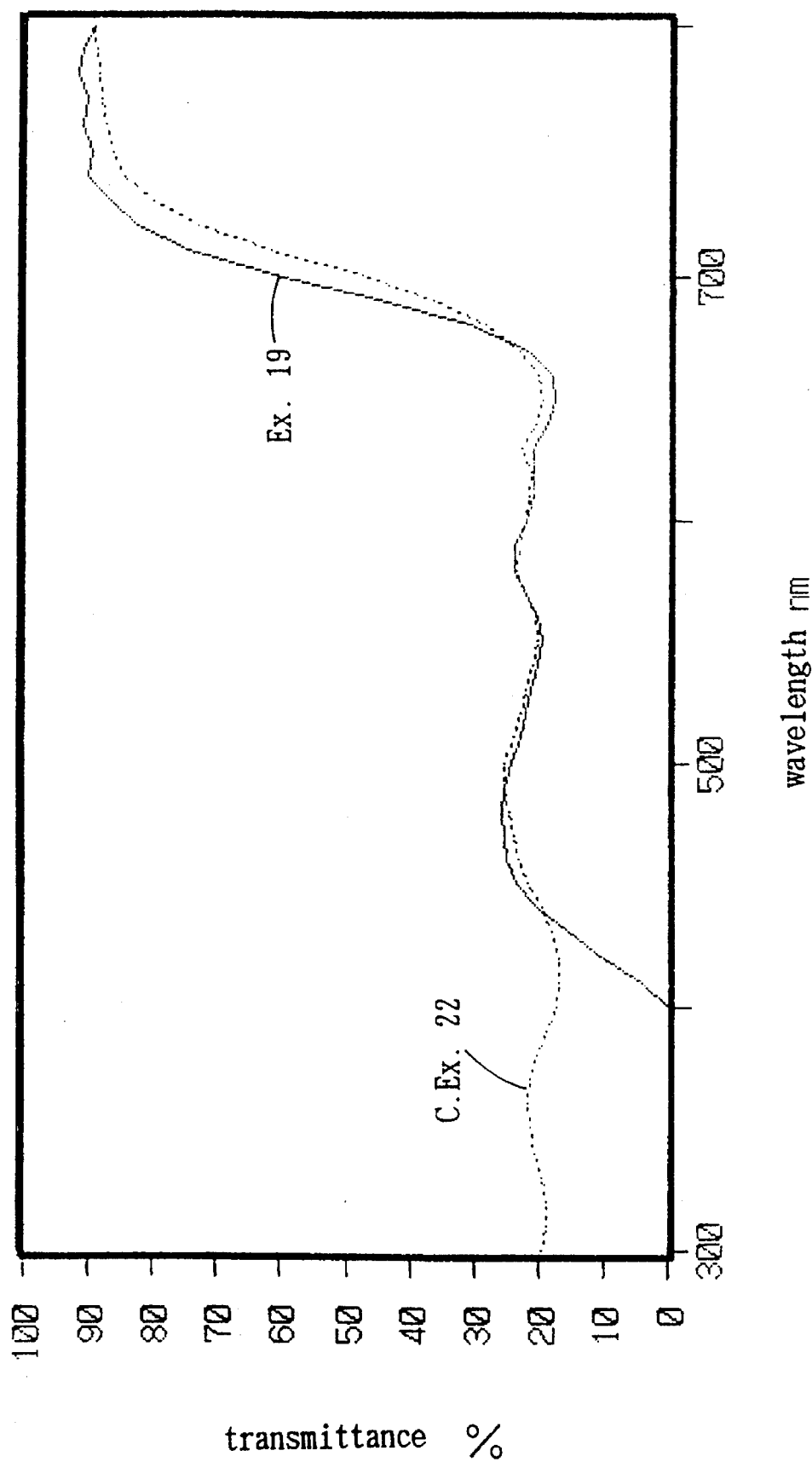
FIG. 17 shows a spectral curve of a polyvinyl alcohol film prepared in Example 19 and Comparative Example 22.

A polyvinyl alcohol film (Kuraray Vinylone VF9P75RB, supplied by Kuraray Co., Ltd.) was washed with water by immersing it in water at 35° C. for 5 minutes, and stretched in water 2.6 times in a monoaxial direction. This film was immersed in an aqueous solution containing 2.00 g/l of 2,2',4,4'-tetrahydroxybenzophenone and 0.32 g/l of sodium hydroxide (hydroxybenzophenone/sodium hydroxide molar ratio=1/1) at 35° C. for 5 minutes, stretched in the aqueous solution 4 times in a monoaxial direction, and then dried at 110° C. for 3 minutes to give a polyvinyl alcohol capable of absorbing longer wavelength ultraviolet radiation. The transmittance of this film at 380 nm was 0.1%, the transmittance thereof at 400 nm was 0.1%, and the transmittance thereof at 420 nm was 4.9%. The content of hydroxybenzophenone per 1 $cm^2$ of the film was 94.3 µg, and the complex ratio of hydroxybenzophenone to sodium hydroxide was 0.98.

EXAMPLE 2

An aqueous solution containing 2.00 g/l of 2,2',4,4'-tetrahydroxybenzophenone and 0.65 g/l of sodium hydroxide (hydroxybenzophenone/sodium hydroxide molar ratio=1/2) was prepared. A polyvinyl alcohol film capable of absorbing longer wavelength ultraviolet radiation was obtained in the same manner as in Example 1 except that the aqueous solution was replaced with the above-prepared aqueous solution. The transmittance of this film at 380 nm was 0.1%, the transmittance thereof at 400 nm was 0.1%, and the transmittance thereof at 420 nm was 0.2%. The content of hydroxybenzophenone per 1 $cm^2$ of the film was 74.2 µg, and the complex ratio of hydroxybenzophenone to sodium hydroxide was 1.95.

EXAMPLE 3

An aqueous solution containing 2.00 g/l of 2,2',4,4'-tetrahydroxybenzophenone, 0.32 g/l of sodium hydroxide and 10.00 g/l of sodium sulfate (hydroxybenzophenone/sodium hydroxide molar ratio=1/1) was prepared. A polyvinyl alcohol film capable of absorbing longer wavelength ultraviolet radiation was obtained in the same manner as in Example 1 except that the aqueous solution was replaced with the above-prepared aqueous solution. The transmittance of this film at 380 nm was 0.1%, the transmittance thereof at 400 nm was 0.1%, and the transmittance thereof at 420 nm was 0.2%. The content of hydroxybenzophenone per 1 $cm^2$ of the film was 127.3 µg, and the complex ratio of hydroxybenzophenone to sodium hydroxide was 0.98.

EXAMPLE 4

An aqueous solution containing 2.00 g/l of 2,2',4,4'-tetrahydroxybenzophenone, 0.32 g/l of sodium hydroxide and 10.00 g/l of sodium chloride (hydroxybenzophenone/sodium hydroxide molar ratio=1/1) was prepared. A polyvinyl alcohol film capable of absorbing longer wavelength ultraviolet radiation was obtained in the same manner as in Example 1 except that the aqueous solution was replaced with the above-prepared aqueous solution. The transmittance of this film at 380 nm was 0.1%, the transmittance thereof at 400 nm was 0.1%, and the transmittance thereof at 420 nm was 0.4%. The content of hydroxybenzophenone per 1 $cm^2$ of the film was 125.0 µg, and the complex ratio of hydroxybenzophenone to sodium hydroxide was 0.97.

EXAMPLE 5

An aqueous solution containing 2.00 g/l of 2,2',4,4'-tetrahydroxybenzophenone and 0.46 g/l of potassium hydroxide (hydroxybenzophenone/potassium hydroxide molar ratio=1/1) was prepared. A polyvinyl alcohol film capable of absorbing longer wavelength ultraviolet radiation was obtained in the same manner as in Example 1 except that the aqueous solution was replaced with the above-prepared aqueous solution. The transmittance of this film at 380 nm was 0.1%, the transmittance thereof at 400 nm was 0.2%, and the transmittance thereof at 420 nm was 5.1%. The content of hydroxybenzophenone per 1 $cm^2$ of the film was 90.2 µg, and the complex ratio of hydroxybenzophenone to potassium hydroxide was 0.99.

EXAMPLE 6

An aqueous solution containing 2.00 g/l of 2,2',4,4'-tetrahydroxybenzophenone and 0.86 g/l of sodium carbonate (hydroxybenzophenone/sodium carbonate molar ratio=1/1) was prepared. A polyvinyl alcohol film capable of absorbing longer wavelength ultraviolet radiation was obtained in the same manner as in Example 1 except that the aqueous solution was replaced with the above-prepared aqueous solution. The transmittance of this film at 380 nm was 0.1%, the transmittance thereof at 400 nm was 0.1%, and the transmittance thereof at 420 nm was 0.8%. The content of hydroxybenzophenone per 1 cm² of the film was 101.2 μg, and the complex ratio of hydroxybenzophenone to sodium carbonate was 0.96.

EXAMPLE 7

An aqueous solution containing 2.00 g/l of 2,2',4,4'-tetrahydroxybenzophenone and 0.78 g/l of ammonium carbonate (hydroxybenzophenone/ammonium carbonate molar ratio=1/1) was prepared. A polyvinyl alcohol film capable of absorbing longer wavelength ultraviolet radiation was obtained in the same manner as in Example 1 except that the aqueous solution was replaced with the above-prepared aqueous solution. The transmittance of this film at 380 nm was 0.1%, the transmittance thereof at 400 nm was 1.8%, and the transmittance thereof at 420 nm was 28.7%. The content of hydroxybenzophenone per 1 cm² of the film was 71.3 μg, and the complex ratio of hydroxybenzophenone to ammonium carbonate was 0.95.

EXAMPLE 8

An aqueous solution containing 2.00 g/l of 2,2',4,4'-tetrahydroxybenzophenone and 0.64 g/l of ammonium bicarbonate (hydroxybenzophenone/ammonium bicarbonate molar ratio=1/1) was prepared. A polyvinyl alcohol film capable of absorbing longer wavelength ultraviolet radiation was obtained in the same manner as in Example 1 except that the aqueous solution was replaced with the above-prepared aqueous solution. The transmittance of this film at 380 nm was 0.1%, the transmittance thereof at 400 nm was 2.3%, and the transmittance thereof at 420 nm was 31.2%. The content of hydroxybenzophenone per 1 cm² of the film was 68.3 μg, and the complex ratio of hydroxybenzophenone to ammonium bicarbonate was 0.91.

EXAMPLE 9

An aqueous solution containing 2.00 g/l of 2,2'-dihydroxy-4-methoxybenzophenone and 0.66 g/l of sodium hydroxide (hydroxybenzophenone/sodium hydroxide molar ratio=1/2) was prepared. A polyvinyl alcohol film capable of absorbing longer wavelength ultraviolet radiation was obtained in the same manner as in Example 1 except that the aqueous solution was replaced with the above-prepared aqueous solution. The transmittance of this film at 380 nm was 1.4%, the transmittance thereof at 400 nm was 3.2%, and the transmittance thereof at 420 nm was 9.8%. The content of hydroxybenzophenone per 1 cm² of the film was 81.3 μg, and the complex ratio of hydroxybenzophenone to sodium hydroxide was 1.80.

EXAMPLE 10

An aqueous solution containing 2.00 g/l of 2,2',4,4'-tetrahydroxybenzophenone and 0.82 g/l of triethylamine (hydroxybenzophenone/triethylamine molar ratio=1/1) was prepared. A polyvinyl alcohol capable of absorbing longer wavelength ultraviolet radiation was obtained in the same manner as in Example 1 except that the aqueous solution was replaced with the above-prepared aqueous solution. The transmittance of this film at 380 nm was 0.1%, the transmittance thereof at 400 nm was 0.3 %, and the transmittance thereof at 420 nm was 12.3%. The content of hydroxybenzophenone per 1 cm² of the film was 93.1 μg, and the complex ratio of hydroxybenzophenone to triethylamine was 0.96.

EXAMPLE 11

An aqueous solution containing 2.00 g/l of 2,2',4,4'-tetrahydroxybenzophenone and 1.64 g/l of triethylamine (hydroxybenzophenone/triethylamine molar ratio=1/2) was prepared. A polyvinyl alcohol film capable of absorbing longer wavelength ultraviolet radiation was obtained in the same manner as in Example 1 except that the aqueous solution was replaced with the above-prepared aqueous solution. The transmittance of this film at 380 nm was 0.1%, the transmittance thereof at 400 nm was 0.1%, and the transmittance thereof at 420 nm was 0.2%. The content of hydroxybenzophenone per 1 cm² of the film was 72.2 μg, and the complex ratio of hydroxybenzophenone to triethylamine was 1.92.

EXAMPLE 12

An aqueous solution containing 2.00 g/l of 2,2',4,4'-tetrahydroxybenzophenone, 0.82 g/l of triethylamine and 10.00 g/l of sodium sulfate (hydroxybenzophenone/triethylamine molar ratio=1/1) was prepared. A polyvinyl alcohol film capable of absorbing longer wavelength ultraviolet radiation was obtained in the same manner as in Example 1 except that the aqueous solution was replaced with the above-prepared aqueous solution. The transmittance of this film at 380 nm was 0.1%, the transmittance thereof at 400 nm was 0.1%, and the transmittance thereof at 420 nm was 0.2%. The content of hydroxybenzophenone per 1 cm² of the film was 125.5 μg, and the complex ratio of hydroxybenzophenone to triethylamine was 0.97.

EXAMPLE 13

An aqueous solution containing 2.00 g/l of 2,2',4,4'-tetrahydroxybenzophenone and 0.59 g/l of n-butylamine (hydroxybenzophenone/n-butylamine molar ratio=1/1) was prepared. A polyvinyl alcohol film capable of absorbing longer wavelength ultraviolet radiation was obtained in the same manner as in Example 1 except that the aqueous solution was replaced with the above-prepared aqueous solution. The transmittance of this film at 380 nm was 0.1%, the transmittance thereof at 400 nm was 0.2%, and the transmittance thereof at 420 nm was 7.2%. The content of hydroxybenzophenone per 1 cm² of the film was 98.4 μg, and the complex ratio of hydroxybenzophenone to n-butylamine was 0.95.

EXAMPLE 14

An aqueous solution containing 2.00 g/l of 2,2',4,4'-tetrahydroxybenzophenone and 0.81 g/l of cyclohexylamine (hydroxybenzophenone/cyclohexylamine molar ratio=1/1) was prepared. A polyvinyl alcohol film capable of absorbing longer wavelength ultraviolet radiation was obtained in the same manner as in Example 1 except that the aqueous solution was replaced with the above-prepared aqueous solution. The transmittance of this film at 380 nm was 0.1%, the transmittance thereof at 400 nm was 0.3%, and the transmittance thereof at 420 nm was 9.8%. The content of hydroxybenzophenone per 1 cm² of the film was 95.1 μg, and the complex ratio of hydroxybenzophenone to cyclohexylamine was 0.92.

EXAMPLE 15

An aqueous solution containing 2.00 g/l of 2,2',4,4'-tetrahydroxybenzophenone and 0.69 g/l of piperidine (hydroxybenzophenone/piperidine molar ratio=1/1) was prepared. A polyvinyl alcohol film capable of absorbing longer wavelength ultraviolet radiation was obtained in the same manner as in Example 1 except that the aqueous solution was replaced with the above-prepared aqueous solution. The transmittance of this film at 380 nm was 0.1%, the transmittance thereof at 400 nm was 0.2%, and the transmittance thereof at 420 nm was 4.7%. The content of hydroxybenzophenone per 1 $cm^2$ of the film was 101.5 µg, and the complex ratio of hydroxybenzophenone to piperidlne was 0.99.

EXAMPLE 16

An aqueous solution containing 2.00 g/l of 2,2',4,4'-tetrahydroxybenzophenone and 1.24 g/l of DBU (1,8-diazabicyclo[5.4.0]-7-undecene) (hydroxybenzophenone/DBU molar ratio=1/1) was prepared. A polyvinyl alcohol film capable of absorbing longer wavelength ultraviolet radiation was obtained in the same manner as in Example 1 except that the aqueous solution was replaced with the above-prepared aqueous solution. The transmittance of this film at 380 nm was 0.1%, the transmittance thereof at 400 nm was 0.1%, and the transmittance thereof at 420 nm was 3.3%. The content of hydroxybenzophenone per 1 $cm^2$ of the film was 98.5 g, and the complex ratio of hydroxybenzophenone to DBU was 0.90.

EXAMPLE 17

An aqueous solution containing 2.00 g/l of 2,2'-dihydroxy-4-methoxybenzophenone and 1.66 g/l of triethylamine (hydroxybenzophenone/triethylamine molar ratio=1/2) was prepared. A polyvinyl alcohol film capable of absorbing longer wavelength ultraviolet radiation was obtained in the same manner as in Example 1 except that the aqueous solution was replaced with the above-prepared aqueous solution. The transmittance of this film at 380 nm was 1.4%, the transmittance thereof at 400 nm was 3.2%. and the transmittance thereof at 420 nm was 9.9%. The content of hydroxybenzophenone per 1 $cm^2$ of the film was 79.5 µg, and the complex ratio of hydroxybenzophenone to triethylamine was 1.79.

EXAMPLE 18

A polyvinyl alcohol film (Kuraray Vinylone VF9P75RB, supplied by Kuraray Co., Ltd.) was washed with water by immersing it in water at 35° C. for 5 minutes, and stretched in water 2.6 times in a monoaxial direction. This film was dyed by immersing it in an aqueous solution containing 0.20 g/l of Chrysophenine (supplied by Sumitomo Chemical Co., Ltd.), 0.38 g/l of Sumllight Red 4B (supplied by Sumitomo Chemical Co., Ltd.), 0.27 g/l of Direct Sky Blue 6B (supplied by Mitsubishi Kasei-Hoechest Co., Ltd.) and 10.00 g/l of sodium sulfate, at 35° C. for 3 minutes, and further treated with boric acid by immersing it in an aqueous solution containing 6.60 g/l of boric acid, at 35° C. for 2 minutes. This film was immersed in an aqueous solution containing 2.00 g/l of 2,2',4,4'-tetrahydroxybenzophenone and 0.32 g/l of sodium hydroxide (hydroxybenzophenone/sodium hydroxide molar ratio=1/1) at 35° C. for 5 minutes, stretched in the aqueous solution 4 times in a monoaxial direction, and dried at 110° C. for 3 minutes to give a polarizing film capable of absorbing longer wavelength Ultraviolet radiation. The transmittance of this film at 380 nm was 0.0%, the transmittance thereof at 400 nm was 0.1%, and the transmittance thereof at 420 nm was 9.8%. The single plate transmittance thereof was 21.63%.

EXAMPLE 19

An aqueous solution containing 2.00 g/l of 2,2',4,4'-tetrahydroxybenzophenone and 0.82 g/l of triethylamine (hydroxybenzophenone/triethylamine molar ratio=1/1) was prepared. A polarizing film capable of absorbing longer wavelength ultraviolet radiation was obtained in the same manner as in Example 18 except that the aqueous solution was replaced with the above-prepared aqueous solution. The transmittance of this film at 380 nm was 0.0%, the transmittance thereof at 400 nm was 0.1%, and the transmittance thereof at 420 nm was 9.9%. The single plate transmittance thereof was 21.85%.

Comparative Example 1

A polyvinyl alcohol film (Kuraray Vinylone VF9P75RB, supplied by Kuraray Co., Ltd.) was washed with water by immersing it in water at 35° C. for 5 minutes, and stretched in water 4 times in a monoaxial direction. The washed film was dried at 110° C. for 3 minutes to give a polyvinyl alcohol film. The transmittance of this film at 380 nm was 88.6%, the transmittance thereof at 400 nm was 89.2%, and the transmittance thereof at 420 nm was 89.5%.

Comparative Example 2

An aqueous solution containing 0.50 g/l of 2,2',4,4'-tetrahydroxybenzophenone was prepared, and a polyvinyl alcohol film was treated in the same manner as in Example 1 except that the aqueous solution was replaced with the above-prepared aqueous solution. The film showed insufficient absorption to longer wavelength ultraviolet radiation. That is, the transmittance of this film at 380 nm was 6.4%, the transmittance thereof at 400 nm was 44.8%, and the transmittance thereof at 420 nm was 78.5%.

Comparative Example 3

An attempt was made to prepare an aqueous solution containing 2.00 g/l of 2,2',4,4'-tetrahydroxybenzophenone, but the hydroxybenzophenone was not completely dissolved.

Comparative Example 4

An aqueous solution containing 0.32 g/l of sodium hydroxide was prepared. Example 1 was repeated using the above solution to give a polyvinyl alcohol film. The transmittance of this film at 380 nm was 88.5%, the transmittance thereof at 400 nm was 89.1%, and the transmittance thereof at 420 nm was 89.4%. No ultraviolet radiation absorption capability was observed.

Comparative Example 5

A polyvinyl alcohol film (Kuraray Vinylone VF9P75RB, supplied by Kuraray Co., Ltd.) was washed with water by immersing it in water at 35° C. for 5 minutes, and stretched in water 2.6 times in a monoaxial direction. This film was immersed in an aqueous solution containing 0.50 g/l of 2,2',4,4'-tetrahydroxybenzophenone and 1.61 g/l of chromium (III) chloride (hydroxybenzophenone/chromium (III) chloride molar ratio=1/5) at 35° C. for 20 minutes, stretched in the aqueous solution 4 times in a monoaxial direction, and then dried at 110° C. for 3 minutes to give a polyvinyl alcohol film. The film showed insufficient absorption to longer wavelength ultraviolet radiation. That is, the transmittance of the film at 380 nm was 1.2%, the transmittance thereof at 400 nm was 10.8%, and the transmittance thereof at 420 nm was 32.5%.

Comparative Example 6

When an aqueous solution containing 2.00 g/l of 2,2',4,4'-tetrahydroxybenzophenone, 0.82 g/l of triethylamine and 6.78 g/l of silver acetate (hydroxybenzophenone/triethylamine/silver ion molar ratio=1/1/5) was prepared, a yellowish precipitate was formed. This solution was therefore not suitable for treating a polyvinyl alcohol film.

Comparative Example 7

When an aqueous solution containing 2.00 g/l of 2,2',4,4'-tetrahydroxybenzophenone, 0.82 g/l of triethylamine and 5.15 g/l of iron (II) chloride (hydroxybenzophenone/triethylamine/iron ion molar ratio=1/1/5) was prepared, a brownish precipitate was formed. This solution was therefore not suitable for treating a polyvinyl alcohol film.

Comparative Example 8

When an aqueous solution containing 2.00 g/l of 2,2',4,4'-tetrahydroxybenzophenone, 0.82 g/l of triethylamine and 7.39 g/l of copper (II) acetate (hydroxybenzophenone/triethylamine/copper ion molar ratio =1/1/5) was prepared, a yellowish precipitate was formed. This solution was therefore not suitable for treating a polyvinyl alcohol film.

Comparative Example 9

When an aqueous solution containing 2.00 g/l of 2,2',4,4'-tetrahydroxybenzophenone, 0.82 g/l of triethylamine and 7.45 g/l of zinc acetate (hydroxybenzophenone/triethylamine/zinc ion molar ratio=1/1/5) was prepared, a white precipitate was formed. This solution was therefore not suitable for treating a polyvinyl alcohol film.

Comparative Example 10

When an aqueous solution containing 2.00 g/l of 2,2',4,4'-tetrahydroxybenzophenone, 0.82 g/l of triethylamine and 7.18 g/l of nickel acetate (hydroxybenzophenone/triethylamine/nickel acetate molar ratio=1/1/5) was prepared, a yellowish green precipitate was formed. This solution was therefore not suitable for treating a polyvinyl alcohol film.

Comparative Example 11

An aqueous solution containing 0.50 g/l of 2,2',4,4'-tetrahydroxybenzophenone and 1.67 g/l of sodium acetate (hydroxybenzophenone/sodium acetate molar ratio=1/10) was prepared. A polyvinyl alcohol film was obtained in the same manner as in Comparative Example 5 except that the aqueous solution was replaced with the above-prepared aqueous solution. The film showed insufficient absorption to longer wavelength ultraviolet radiation. That is, the transmittance of the resultant film at 380 nm was 0.6%, the transmittance thereof at 400 nm was 10.3%, and the transmittance thereof at 420 nm was 48.4%.

Comparative Example 12

An aqueous solution containing 0.50 g/l of 2,2',4,4'-tetrahydroxybenzophenone and 1.54 g/l of ammonium acetate (hydroxybenzophenone/ammonium acetate molar ratio=1/5) was prepared. A polyvinyl alcohol film was obtained in the same manner as in Comparative Example 5 except that the aqueous solution was replaced with the above-prepared aqueous solution. The film showed insufficient absorption to longer wavelength ultraviolet radiation. That is, the transmittance of the resultant film at 380 nm was 1.3%, the transmittance thereof at 400 nm was 25.0%, and the transmittance thereof at 420 nm was 68.8%.

Comparative Example 13

An aqueous solution containing 0.50 g/l of 2,2',4,4'-tetrahydroxybenzophenone and 1.45 g/l of magnesium acetate (hydroxybenzophenone/magnesium acetate molar ratio=1/5) was prepared. A polyvinyl alcohol film was obtained in the same manner as in Comparative Example 5 except that the aqueous solution was replaced with the above-prepared aqueous solution. The film showed insufficient absorption to longer wavelength ultraviolet radiation. That is, the transmittance of the resultant film at 380 nm was 0.7%, the transmittance thereof at 400 nm was 9.2%, and the transmittance thereof at 420 nm was 39.7%.

Comparative Example 14

An aqueous solution containing 0.50 g/l of 2,2',4,4'-tetrahydroxybenzophenone and 1.61 g/l of calcium acetate (hydroxybenzophenone/magnesium acetate molar ratio=1/5) was prepared. A polyvinyl alcohol film was obtained in the same manner as in Comparative Example 5 except that the aqueous solution was replaced with the above-prepared aqueous solution. The film showed insufficient absorption to longer wavelength ultraviolet radiation. That is, the transmittance of the resultant film at 380 nm was 0.6%, the transmittance thereof at 400 nm was 9.8%, and the transmittance thereof at 420 nm was 45.0%.

Comparative Example 15

An aqueous solution containing 0.50 g/l of 2,2',4,4'-tetrahydroxybenzophenone and 2.55 g/l of barium acetate (hydroxybenzophenone/barium acetate molar ratio=1/5) was prepared. A polyvinyl alcohol film was obtained in the same manner as in Comparative Example 5 except that the aqueous solution was replaced with the above-prepared aqueous solution. The film showed insufficient absorption to longer wavelength ultraviolet radiation. That is, the transmittance of the resultant film at 380 nm was 0.7%, the transmittance thereof at 400 nm was 10.8%, and the transmittance thereof at 420 nm was 49.5%.

Comparative Example 16

An aqueous solution containing 0.50 g/l of 2,2',4,4'-tetrahydroxybenzophenone and 1.86 g/l of zinc acetate (hydroxybenzophenone/zinc acetate molar ratio=1/5) was prepared. A polyvinyl alcohol film was obtained in the same manner as in Comparative Example 5 except that the aqueous solution was replaced with the above-prepared aqueous solution. The film showed insufficient absorption to longer wavelength ultraviolet radiation. That is, the transmittance of the resultant film at 380 nm was 1.1%, the transmittance thereof at 400 nm was 15.5%, and the transmittance thereof at 420 nm was 50.9%.

Comparative Example 17

An aqueous solution containing 0.50 g/l of 2,2',4,4'-tetrahydroxybenzophenone and 1.76 g/l of manganese acetate (hydroxybenzophenone/manganese acetate molar ratio=1/5) was prepared. A polyvinyl alcohol film was obtained in the same manner as in Comparative Example 5 except that the aqueous solution was replaced with the above-prepared aqueous solution. The film showed insufficient absorption to longer wavelength ultraviolet radiation. That is, the transmittance of the resultant film at 380 nm was 0.8 the transmittance thereof at 400 nm was 10.9%, and the transmittance thereof at 420 nm was 36.6%.

Comparative Example 18

An aqueous solution containing 0.50 g/l of 2,2',4,4'-tetrahydroxybenzophenone and 1.80 g/l of cobalt acetate (hydroxybenzophenone/cobalt acetate molar ratio=1/5) was prepared. A polyvinyl alcohol film was obtained in the same manner as in Comparative Example 5 except that the aqueous solution was replaced with the above-prepared aqueous solution. The film showed insufficient absorption to longer wavelength ultraviolet radiation. That is, the transmittance of the resultant film at 380 nm was 1.1%, the transmittance thereof at 400 nm was 10.5%, and the transmittance thereof at 420 nm was 32.0%.

Comparative Example 19

An aqueous solution containing 0.50 g/l of 2,2',4,4'-tetrahydroxybenzophenone and 1.79 g/l of nickel acetate (hydroxybenzophenone/nickel acetate molar ratio=1/5) was prepared. A polyvinyl alcohol film was obtained in the same manner as in Comparative Example 5 except that the aqueous solution was replaced with the above-prepared aqueous solution. The film showed insufficient absorption to longer wavelength ultraviolet radiation. That is, the transmittance of the resultant film at 380 nm was 1.3%, the transmittance thereof at 400 nm was 11.1%, and the transmittance thereof at 420 nm was 32.9%.

Comparative Example 20

An aqueous solution containing 0.50 g/l of 2,2',4,4'-tetrahydroxybenzophenone and 1.69 g/l of silver acetate (hydroxybenzophenone/silver acetate molar ratio=1/5) was prepared. A polyvinyl alcohol film was obtained in the same manner as in Comparative Example 5 except that the aqueous solution was replaced with the above-prepared aqueous solution. The film showed insufficient absorption to longer wavelength ultraviolet radiation. That is, the transmittance of the resultant film at 380 nm was 0.8%, the transmittance thereof at 400 nm was 13.1%, and the transmittance thereof at 420 nm was 48.1%.

Comparative Example 21

Attempts were made to prepare aqueous solutions containing 2.00 g/l of 2,2',4,4'-tetrahydroxybenzophenone and any one of 6.43 g/l of chromium (III) chloride, 3.33 g/l of sodium acetate, 3.13 g/l of ammonium acetate, 5.78 g/l of magnesium acetate, 6.42 g/l of calcium acetate, 10.37 g/l of barium acetate, 7.45 g/l of zinc acetate, 7.03 g/l of manganese acetate, 7.19 g/l of cobalt acetate, 7.18 g/l of nickel acetate and 6.78 g/l of silver acetate (hydroxybenzophenone/each of the above metal salts molar ratio=1/5) but in all the cases the hydoxybenzophenone was not completely dissolved.

Comparative Example 22

A polyvinyl alcohol film (Kuraray Vinylone VF9P75RB, supplied by Kuraray Co., Ltd.) was washed with water by immersing it in water at 35° C. for 5 minutes, and stretched in water 2.6 times in a monoaxial direction. This film was dyed by immersing it in an aqueous solution containing 0.20 g/l of Chrysophenine (supplied by Sumitomo Chemical Co., Ltd.), 0.38 g/l of Sumilight Red 4B (supplied by Sumitomo Chemical Co., Ltd.), 0.27 g/l of Direct Sky Blue 6B (supplied by Mitsubishi Kasei-Hoechest Co., Ltd.) and 10.00 g/l of sodium sulfate, at 35° C. for 3 minutes, and further treated with boric acid by immersing it in an aqueous solution containing 6.60 g/l of boric acid, at 35° C. for 2 minutes. The resultant film was stretched in the aqueous solution 4 times in a monoaxial direction, and dried at 110° C. for 3 minutes to give a polarizing film. The transmittance of this film at 380 nm was 20.3%, the transmittance thereof at 400 nm was 17.5%, and the transmittance thereof at 420 nm was 17.1%, and the single plate transmittance was 22.24%.

The polyvinyl alcohol film according to the present invention is excellent in the capability of absorbing ultraviolet radiation and is particularly capable of effectively blocking ultraviolet radiation in the wavelength range from 360 to 400 nm, which is harmful to human bodies, clothes, foods and resins. The polyvinyl alcohol film according to the present invention can be used in the optical fields of polarizing sunglasses, the fields of displays such as a liquid crystal display and the fields of wrapping materials for clothes or foods as it is or as a laminate of the polyvinyl alcohol film with a glass sheet or a transparent resin or those optionally surface-treated by coloring, vapor-deposition or hardcoating.

What is claimed is:

1. A transparent protective polyvinyl alcohol film for substantially blocking ultraviolet radiation of a wavelength of 360–400 nm, characterized in that said polyvinyl alcohol film contains an effective amount of at least one of the complexes of a hydroxybenzophenone compound of the formula (I),

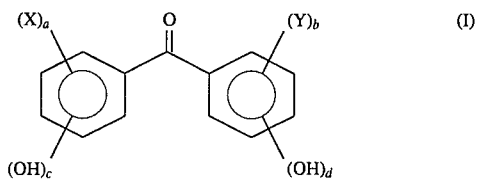

wherein each of X and Y is independently a halogen atom, an alkyl group having 1 to 6 carbon atoms, an aryl group having 6 to 15 carbon atoms, an alkoxyl group having 1 to 6 carbon atoms, an amino group, an acyl group having 2 to 6 carbon atoms, a carboxyl group, a sulfonic acid group or a metal salt thereof, each of a, b, c and d is independently an integer of 0 to 5, (c+d) is an integer of 1 to 10, (a+c) is an integer of 0 to 5, and (b+d) is an integer of 0 to 5, and at least one basic compound selected from the group consisting of (i) a hydroxide, carbonate or bicarbonate of an alkali metal, (ii) a carbonate or bicarbonate of ammonium, and (iii) an amine compound.

2. The polyvinyl alcohol film of claim 1, wherein the complex is a complex of a hydroxybenzophenone compound of the formula (I) and at least one basic compound selected from the group consisting of (i) a hydroxide, carbonate or bicarbonate of an alkali metal, and (ii) carbonate or bicarbonate of ammonium.

3. The polyvinyl alcohol film of claim 1, wherein the hydroxybenzophenone compound of the formula (I) has at least one hydroxyl group on at least 2-position or at least two hydroxyl groups on 2,2'-positions.

4. The polyvinyl alcohol film of claim 1, wherein the complex has a molar ratio of the basic compound to the hydroxybenzophenone compound in the range of from 0.1 to 10.

5. The polyvinyl alcohol film of claim 1, wherein the polyvinyl alcohol film contains the hydroxybenzophenone compound in an amount of 6 to 600 µg per $cm^2$ of the film as an analysis value.

6. A process for the production of a polyvinyl alcohol film as recited in claim 1, which comprises immersing a polyvinyl alcohol film in an aqueous medium solution containing (a) a compound of the formula (I) and (b) at least one basic compound selected from the group consisting of (i) a hydroxide, carbonate or bicarbonate of an alkali metal, (ii) carbonate or bicarbonate of ammonium and (iii) an amine compound, and then drying the immersed polyvinyl alcohol film.

7. The process of claim 6, wherein the aqueous medium is water or a mixed medium containing water and a water-soluble organic solvent.

8. The process of claim 6, wherein the aqueous medium solution contains 0.5 to 500 g/l of the hydroxybenzophenone compound.

9. The process of claim 6, wherein the aqueous medium solution contains the basic compound in an amount of 0.1 to 10 mol per mole of the hydroxybenzophenone compound.

10. The process of claim 6, wherein the immersion is carried out at a temperature of 10° to 80° C.

11. A laminated film comprising at least one transparent resin film or glass sheet and the polyvinyl alcohol film recited in claim 1.

12. The laminated film of claim 11, wherein the transparent resin film is a polycarbonate resin film, acrylic resin film, allyl resin film, a cellulose resin film, polyester resin film or polypropylene resin film.

13. A laminated film of claim 11, comprising two transparent resin films or glass sheets and the polyvinyl alcohol film between them.

14. The polyvinyl alcohol film of claim 1, wherein the hydroxybenzophenone compound of the formula (I) is 2,2',4,4'-tetrahydroxybenzophenone and the basic compound is a hydroxide of an alkali metal.

* * * * *